(12) United States Patent
Giannoni

(10) Patent No.: US 11,644,246 B2
(45) Date of Patent: May 9, 2023

(54) HEAT EXCHANGE CELL AND METHOD

(71) Applicant: CONDEVO S.P.A., Milan (IT)

(72) Inventor: Rocco Giannoni, Marudo (IT)

(73) Assignee: CONDEVO S.P.A., Milan (IT)

( * ) Notice: Subject to any disclaimer, the term of this patent is extended or adjusted under 35 U.S.C. 154(b) by 0 days.

(21) Appl. No.: 16/767,365

(22) PCT Filed: Nov. 28, 2018

(86) PCT No.: PCT/IB2018/059412
§ 371 (c)(1),
(2) Date: May 27, 2020

(87) PCT Pub. No.: WO2019/106567
PCT Pub. Date: Jun. 6, 2019

(65) Prior Publication Data
US 2020/0386482 A1 Dec. 10, 2020

(30) Foreign Application Priority Data
Nov. 29, 2017 (IT) .......................... 102017000137013

(51) Int. Cl.
*F28D 7/02* (2006.01)
*F28F 9/00* (2006.01)
*F24H 1/16* (2022.01)

(52) U.S. Cl.
CPC ............... *F28D 7/024* (2013.01); *F24H 1/16* (2013.01); *F28F 9/001* (2013.01)

(58) Field of Classification Search
CPC . F28F 9/0137; F28F 9/22; F28F 7/024; F28D 1/0472; F24H 1/40; F24H 1/43; F24H 1/16; F24H 1/165
See application file for complete search history.

(56) References Cited

U.S. PATENT DOCUMENTS 4,798,240 A * 1/1989 Gerstmann ............... F24H 1/43
237/19
2006/0196450 A1* 9/2006 Le Mer ..................... F24H 1/43
122/18.1
(Continued)

FOREIGN PATENT DOCUMENTS

CN 15855884 A 2/2005
CN 1809715 A 7/2006
(Continued)

OTHER PUBLICATIONS

Chinese Office Action dated May 8, 2021, issued in corresponding Chinese application.
(Continued)

*Primary Examiner* — Jianying C Atkisson
*Assistant Examiner* — For K Ling
(74) *Attorney, Agent, or Firm* — Husch Blackwell LLP

(57) ABSTRACT

A heat exchange cell includes a helically-shaped heat exchanger, in which a first heat transfer fluid circulates; a first heat exchange chamber in which a first collection chamber is defined; a second heat exchange chamber in which a second collection chamber is defined; and a fluid outlet passage from the second heat exchange chamber.
The first and second heat exchange chambers are separated by a first separating element comprising a substantially plate-shaped body and by at least a second separating element so as to define at least one passage of fluid between the first and the second collection chamber of the second heat transfer fluid.
A pair of axial separator baffles extend axially between the second separating element and the rear wall of the containment casing, and are configured to separate a first portion of the second collection chamber from a second portion of the second collection chamber.

19 Claims, 6 Drawing Sheets

(56) References Cited

U.S. PATENT DOCUMENTS

| | | | | |
|---|---|---|---|---|
| 2006/0219395 A1* | 10/2006 | Le Mer | ...................... | F24H 8/00 |
| | | | | 165/163 |
| 2007/0209606 A1* | 9/2007 | Hamada | .................. | F24H 1/523 |
| | | | | 122/18.1 |
| 2010/0126432 A1* | 5/2010 | Eberle | ................. | F28D 21/0007 |
| | | | | 122/20 B |
| 2015/0176861 A1* | 6/2015 | Karaki | ...................... | F24H 1/43 |
| | | | | 122/18.4 |

FOREIGN PATENT DOCUMENTS

| | | | | | |
|---|---|---|---|---|---|
| CN | 201327167 | Y | | 10/2009 | |
| CN | 107076459 | A | | 8/2017 | |
| DE | 102006004506 | A1 | * | 5/2007 | ............... F24H 8/00 |
| EP | 1281919 | A2 | * | 2/2003 | ................ F28F 1/02 |
| EP | 1281919 | A2 | | 2/2003 | |
| EP | 3139106 | A1 | | 3/2017 | |
| GB | 1246581 | A | | 9/1971 | |
| KR | 20-1986-000018 | | | 2/1986 | |
| WO | 9609499 | A1 | | 3/1996 | |
| WO | 2011092332 | A1 | | 8/2011 | |
| WO | 2014/199359 | A2 | | 12/2014 | |
| WO | 2017102490 | A1 | | 6/2017 | |

OTHER PUBLICATIONS

Korean Office Action dated Jan. 10, 2023, issued in korean application.

* cited by examiner

HEAT EXCHANGE CELL AND METHOD

CROSS REFERENCE TO RELATED APPLICATIONS

This application is a U.S. National Phase Application of International Application No. PCT/IB2018/059412 filed on Nov. 28, 2018, which claims priority to Italian Application No. 102017000137013 filed on Nov. 29, 2017. The disclosures of International Application No. PCT/IT2017/000269 Italian Application No. 102017000137013 are incorporated herein by reference.

BACKGROUND OF THE INVENTION

The present invention relates to a heat exchange cell and a heat exchange method that can be carried out by means of such a cell.

In particular, the invention relates to a heat exchange cell comprising at least one heat exchanger mounted in a respective containment casing, which cell has a preferred although non exclusive use in water heating apparatuses, in heating or air conditioning systems, for both domestic use and for use in complexes of dwelling-houses, industrial areas or shopping areas.

In the following description and in the appended claims, the term: "heat exchange cell" is used to indicate a unit, preferably of a modular type, comprising at least one heat exchanger mounted in a respective containment casing and configured to carry out a heat exchange between a first heat transfer fluid circulating within the heat exchanger, and a second heat transfer fluid flowing in the containment casing externally to the heat exchanger itself.

In a preferred embodiment and as will become apparent hereinafter, the invention relates to a heat exchange cell and method of the condensation type.

RELATED ART

As is known, the function of a heat exchange cell is to transfer thermal energy between two fluids, hereinafter precisely referred to as first and second heat transfer fluid.

For example, in the case of common domestic gas boilers, the function of the heat exchange cell is to heat water circulating inside the heat exchanger mounted in the cell by means of hot combustion gases produced by a burner.

To this end, the heat exchange cells of the condensation type are for example configured to use both the heat developed as a result of combustion, and the latent condensation heat contained in the combustion gases. The amount of the latent condensation heat that is recovered mainly depends on the temperature of the return water from the heating system that enters the lower temperature side of the heat exchange cell.

Currently, heat exchange cells particularly appreciated for their characteristics of high heat exchange efficiency (related to the presence of a large exchange surface), compactness, competitive weight and cost are those equipped with a helically-shaped heat exchanger housed in a respective containment casing.

In particular, such a heat exchanger comprises at least one tubular duct coiled about a longitudinal axis of the helix according to a plurality of coils having a cross-section of a value determined according to the desired thermal power.

The coils of such a tubular duct may have either a flat cross-section, such as for example described in European patent EP 0 678 186 in the name of Le Mer or in European patent application EP 0 745 813 in the name of Viessmann Werke, or a circular cross-section, such as for example described in International patent application WO 2005/080900 in the name of Cosmogas.

In both cases, an interstice is defined between the consecutive coils of the helically wound tubular duct forming a fluid path for the flow of the second heat transfer fluid (for example hot combustion gases produced by a burner) along a substantially radial, or an axial-radial direction if the coils are inclined with respect to a longitudinal axis of the helix. The interstice defined between the consecutive coils of the helically wound tubular duct has a predetermined and preferably constant width.

The helically-shaped tubular duct defines coaxially and internally with respect to the heat exchanger a feeding zone of the second heat transfer fluid in which, in gas-liquid heat exchange cells for water-heating apparatuses, a burner is generally mounted.

As said, the second heat transfer fluid therefore tends to flow through the interstices between the coils in a substantially radial or axial-radial direction, thus transferring heat to the first heat transfer fluid circulating inside the duct.

In a configuration of heat exchange cells of known type and as described, for example, in said European patent EP 0 678 186 or in International patent application WO 2011/092332 in the name of Giannoni France, the second heat transfer fluid—once having flown through the interstices between the coils—reaches an annular collection chamber externally defined with respect to the heat exchanger and externally delimited by the side wall of the casing, to then flow, to then flow into at least a second collection chamber defined internally and coaxially to the heat exchanger at the rear of a partition element supporting a disc of a thermal insulation made of refractory material.

Such a disc is positioned within the heat exchanger so as to divide the helix formed by the same in two parts, respectively upstream and downstream of the partition element with respect to the flowing direction of the second heat transfer fluid.

In this way and as illustrated for example in FIG. 18 of European patent EP 0 678 186, the helically-shaped heat exchanger divided:

- into a first heat exchange, or primary heat exchange, portion positioned upstream of the said partition element with respect to the flowing direction of the combustion gases and directly exposed to the heat produced by the burner, and
- into a second heat exchange, or secondary heat exchange, portion, positioned downstream of said partition element and screened by the same with respect to the burner.

From a functional point of view, the primary heat exchange portion of the heat exchanger is intended to absorb the heat generated by the gas burner upstream of the partition element so as to determine the maximum thermal power that can be delivered by the heat exchanger at the maximum outlet temperature of the first heat transfer fluid, while the secondary heat exchange portion is intended to carry out the recovery of the latent condensation heat of the hot combustion gases downstream of the partition element.

In an entirely corresponding way, a first heat exchange chamber and a second heat exchange chamber are defined in the containment casing of the heat exchange cell.

According to this cell configuration, the hot combustion gases generated by the burner—before being discharged from the heat exchange cell—flow through in series first the primary heat exchange portion of the heat exchanger towards the annular collection chamber, passing through the interstices that separate the coils thereof radially or axially-radially from the inside towards the outside, and then the secondary heat exchange portion towards the second collection chamber, flowing through the interstices that separate the coils thereof radially or axially-radially from the outside towards the inside according to a substantially perpendicular or inclined direction with respect to the side wall of the containment casing.

In one embodiment of this known configuration of the heat exchange cell and as for example illustrated in FIG. 20 of European patent EP 0 678 186 or in FIG. 1 of International patent WO 2011/092332, the cell can further comprise an annular partition wall extending radially between a radially outer wall of the heat exchanger and the peripheral side wall of the containment casing of the cell downstream and at the rear of the said partition element which supports the heat insulation disc, i.e. in the housing zone of the second heat exchange portion of the heat exchanger.

In this way, it is possible to achieve a structure of the heat exchange cell configured to divert the hot combustion gases—prior to their discharge—so that they cross in series:
  a first part of the second heat exchange portion of the heat exchanger passing through the interstices that separate its coils radially or axially-radially from the outside towards the inside according to a substantially perpendicular or inclined direction with respect to the side wall of the containment casing, and after passing beyond the annular partition wall
  a second part of the second heat exchange portion of the heat exchanger passing through the interstices that separate the coils thereof radially or axially-radially from the inside towards the outside.

The hot combustion gases are then discharged to the outside along a substantially transversal direction as illustrated in FIG. 20 of European patent EP 0 678 186 or along the axial direction after being collected again downstream of a second partition element mounted inside the heat exchanger at the second heat exchange portion thereof.

In this second case and as illustrated in FIG. 1 of International patent application WO 2011/092332, the hot combustion gases are collected in a zone interposed between said two partition elements so that such gases:
  flow through a second part of the second heat exchange portion of the heat exchanger passing through the interstices that separate the coils thereof radially or axially-radially from the inside towards the outside,
  reach an annular chamber defined outside the heat exchanger between a radially outer wall of the second heat exchange portion and the containment casing, and
  flow again through the heat exchanger downstream of the second partition element passing along the radial or axial-radial direction from the outside towards the inside before being discharged from the cell along a substantially axial direction.

In yet another configuration of heat exchange cells of the known type and as described for example in US patent application US 2007/0209606, the heat exchange cell includes a vertically mounted spirally shaped heat exchanger and a partition that splits the space surrounded by a spiral shaped tube at an axially intermediate portion of a casing into a first and a second region and that splits the spirally wound tube into a first and a second heat exchange portion. The combustion gas fed to the first region flows towards a combustion gas path passing through an interstice of the first heat exchange portion and then passes through an interstice of the second heat exchange portion.

In one embodiment, illustrated in FIG. 7, a second partition is provided for closing the lower opening of the second region, while a generally ring-shaped guide is provided below the second heat exchange portion of the spirally shaped heat exchanger. The upper surface of the guide is inclined so that the discharge condensate dripping from the second heat exchange portion can be guided towards a receiving portion of the condensate provided below the heat exchanger.

SUMMARY OF THE INVENTION

The Applicant has observed that the aforementioned known configurations of heat exchange cells present some drawbacks and limitations.

In the first place, the Applicant has observed that such cells—whilst having the objective of increasing the energy efficiency of the cell—essentially allow a heat exchange in the second heat exchange chamber of the cell between the combustion gases and the liquid circulating inside the coils of the heat exchanger, while the rear wall of the partition element internal to the heat exchanger, which has a high temperature (usually in the order of 150-300° C.), is substantially by-passed.

In particular, the internal partition element is lapped by the combustion gases only at a radially outer portion thereof having a limited extension before the gases flow away along the axial direction, so that the heat possessed by the gases is not exploited but to a very limited extent.

In the second place, the Applicant has observed that in the cell configuration illustrated in FIG. 18 of European patent EP 0 678 186 the heat in some way collected from the internal partition element by the combustion gases is in any case substantially lost to the chimney as the gases are discharged from the cell itself immediately after.

In the third place, the Applicant has observed that in the horizontal mounting configuration of the heat exchange cells described in European patent EP 0 678 186 and in International patent application WO 2011/092332 a non-optimal fluid dynamic distribution of the combustion gases occurs once the latter have flown through the coils of the heat exchanger coming from the feeding zone.

The combustion gases, in fact, tend to be directed towards the upper part of the heat exchange cell, substantially by-passing the lower part of the heat exchanger along the entire subsequent gas path.

The Applicant has observed that this non-uniform flow distribution of the combustion gases penalises the heat exchange efficiency which is lower than that theoretically possible.

Furthermore, the Applicant has observed that the known configuration providing an axial discharge of the combustion gases from the second collection chamber illustrated in the prior art documents illustrated above, requires the use of gas collection and conveying elements downstream of the heat exchanger and externally to the heat exchange cell which increase the axial extension thereof in an undesired way.

In this regard, it is to be observed that there is an increasingly stringent market demand to limit the dimensions of the heat exchange cells in combination with the minimization of the costs and of the pressure losses on the one hand and the maximization of the heat exchange efficiency on the other hand.

The problem underlying the invention is therefore that of overcoming the drawbacks mentioned above and, in particular, that of providing a heat exchange cell provided with a partition element internal to the coils of the heat exchanger and having an improved energy efficiency.

More particularly, the invention aims at devising a heat exchange cell having improved seasonal energy efficiency, as defined hereinbelow according to the standard EN 15502-1:2012+A1:2015 and that has at the same time a minimum axial dimension.

In this regard, the Applicant has perceived that this objective can be achieved by intervening on the fluid dynamics of the second heat transfer fluid, for example the combustion gases coming from a burner, in the second heat exchange chamber of the cell, by ensuring, with an appropriate subdivision thereof, that the second heat transfer fluid is suitably guided, so as to:

i) reduce to a minimum the dead zones inside the second collection chamber, and ii) maximize the heat exchange between the second heat transfer fluid and all the elements of the cell in some way present in the second collection chamber thereof (coils of the second heat exchange portion of the heat exchanger and internal partition element).

According to a first aspect thereof, the invention therefore relates to a heat exchange cell comprising:

a containment casing comprising a rear wall and a peripheral side wall, a helically-shaped heat exchanger comprising at least one tubular duct for the flow of a first heat transfer fluid coiled about a longitudinal axis of the helix according to a plurality of coils, said heat exchanger being mounted in said containment casing;

a feeding zone of a second heat transfer fluid, intended for the heat exchange with said first heat transfer fluid, defined in the casing coaxially and internally with respect to said heat exchanger;

a first heat exchange chamber, defined in said containment casing and in which a first heat exchange portion of the heat exchanger is housed, said first heat exchange chamber comprising a first collection chamber of the second heat transfer fluid externally defined with respect to the heat exchanger between a radially outer wall of the first heat exchange portion of the heat exchanger and the peripheral side wall of the containment casing;

a second heat exchange chamber, defined in said containment casing and in which a second heat exchange portion of the heat exchanger is housed, said second heat exchange chamber comprising a first collection chamber of the second heat transfer fluid externally defined with respect to the heat exchanger between a radially outer wall of the second heat exchange portion of the heat exchanger and the peripheral side wall of the containment casing;

a fluid outlet passage from the second heat exchange chamber defined in the peripheral side wall of the containment casing near the rear wall of said casing;

wherein said first and second heat exchange chambers are separated inside the heat exchanger by a first separating element comprising a substantially plate-shaped body;

characterized in that said first and second heat exchange chambers are further separated outside the heat exchanger by at least one second separating element, radially extending between a radially outer wall of the heat exchanger and the peripheral side wall of the containment casing, said second separating element being circumferentially extending about the heat exchanger at least at said fluid outlet passage from the second heat exchange chamber so as to define at least one fluid passage between the first collection chamber of the second heat transfer fluid and the second collection chamber of the second heat transfer fluid;

and in that the heat exchange cell further comprises a pair of axial separator baffles, axially extending between said second separating element and the rear wall of the containment casing, and configured to separate a first portion of the second collection chamber of the second heat transfer fluid defined upstream of said axial separator baffles from a second portion of the second collection chamber of the second heat transfer fluid defined downstream of said baffles.

Within the framework of the present description and of the subsequent claims, the various "axial", "longitudinal", "transverse" or "radial" directions or orientations of the cell or of the elements thereof as well as the positioning of said elements in the cell such as "front", "rear" or "side" are intended to be referred to the longitudinal axis of the heat exchanger helix, if not otherwise indicated.

In the operating configuration of the heat exchange cell, such a longitudinal axis may be horizontal or vertical; it follows that the various directions, orientation or positioning of the cell or of the elements thereof should be considered in relation to the orientation of the longitudinal axis of the heat exchanger helix.

In the following description and for descriptive simplicity, reference will conventionally be made, without any limiting intent, to an operating position of the heat exchange cell in which the longitudinal axis of the heat exchanger is horizontal.

Within the framework of the present invention and of the subsequent claims, the term: "thermal power" is used to indicate the amount of energy transferred per unit time in terms of heat between the first heat transfer fluid circulating in the heat exchanger and the second heat transfer fluid circulating externally thereto.

Within the framework of the present description and of the subsequent claims, the term: heat transfer fluid, is used to indicate any fluid capable of receiving/transferring heat from/to external heat sources and of transferring the heat to different points of an apparatus or system in which the fluid circulates.

Thus, for example, in the case of gas-liquid heat exchange cells, the first heat transfer fluid may consist of water to be heated (such as in boilers for domestic use) and the second heat transfer fluid may consist of hot gases, for example combustion gases coming from a burner, or the first heat transfer fluid may consist of a compressed gas or other fluid at relatively high temperature and the second heat transfer fluid may consist of cold air coming from a suitable circulation apparatus (such as in air conditioning systems).

In the following description and in the appended claims, the term: "size" of the containment casing or of the heat exchanger of the cell is used to indicate the space occupied by the same along the axial (i.e., longitudinal) direction and transversely to the axial direction, for example in height and width if the containment casing is substantially prismatic in shape or along the radial direction if the containment casing is substantially cylindrical in shape.

In the following description and in the appended claims, the terms: "upstream" and "downstream" are used to indicate the position of an element or part of the cell with reference to the flowing direction of the respective heat transfer fluid, for example the second heat transfer fluid.

According to the present invention, the Applicant has perceived that with respect to the configurations described above of heat exchange cells of the known type provided with a partition element internal to the coils of the heat exchanger, it is possible to achieve, for the same thermal power, an improved energy efficiency, in particular an improved seasonal energy efficiency, by simultaneously intervening on the following characteristics of the cell:

- on the position of the fluid outlet passage from the second heat exchange chamber, a passage which is peripherally defined in said second chamber between an axial end of the peripheral side wall of the containment casing of the cell and the rear wall of the casing itself; and
- on the configuration of the second heat exchange chamber and, more particularly, of the second collection chamber of the second heat transfer fluid (e.g. the combustion gases of a water heating apparatus), which second heat exchange chamber is suitably separated from the first heat exchange chamber and is internally subdivided so as to direct the flow of the second heat transfer fluid in such a way that a major part of this fluid flows along a substantially transversal direction essentially the entire second heat exchange chamber, and substantially all the coils of the second heat exchange portion of the heat exchanger located therein, before being discharged from the cell.

More particularly, the configuration of the second heat exchange chamber with a subdivided structure according to the invention differs from that of the cells of known type in that:

- the second radial separating element and the aforementioned pair of axial separator baffles actually prevent that a major part of the flow of the second heat transfer fluid (for example, the combustion gases of a water heating apparatus), and preferably substantially all the aforementioned flow, may freely pass from the first collection chamber towards the fluid outlet passage from the second heat exchange chamber;
- the second radial separating element prevents the free flow of the second heat transfer fluid from the first collection chamber towards the portion of the second collection chamber where the fluid outlet passage from the second heat exchange chamber of the cell is positioned;
- the aforementioned pair of axial separator baffles limits, and preferably substantially completely blocks, with the exception of possible fluid leakages, a free flow along the circumferential direction of the second heat transfer fluid in the second collection chamber about the heat exchanger, forcing such a flow to flow though the coils of the heat exchanger positioned upstream of the axial separator baffles before being able to travel along the remaining part of the second heat exchange chamber of the cell.

More particularly and thanks to the subdivided configuration of the second heat exchange chamber achieved by means of the aforementioned pair of axial separator baffles, a major part of, and preferably the entire, flow of the second heat transfer fluid, is forced to flow in series and along a substantially transversal direction:

i) the coils of the second heat exchange portion of the heat exchanger in the first portion of the second collection chamber of the second heat transfer fluid defined upstream of the axial separator baffles;
ii) the zone of the second heat exchange chamber defined inside the heat exchanger; and
iii) the coils of the second heat exchange portion of the heat exchanger in the second portion of the second collection chamber of the second heat transfer fluid defined downstream of the axial separator baffles.

The Applicant has experimentally found that the aforementioned subdivided configuration of the second heat exchange chamber and of the second collection chamber of the second heat transfer fluid allows to achieve within the cell a specific flow of the second heat transfer fluid, which flow exerts the following advantageous technical effects:

i) that of uniformly distributing the flow of the second heat exchange fluid both along the substantially radial or axial-radial direction of the heat exchanger, and in the travel along the first collection chamber in the cell portion located upstream of the first and of the second separating element;
ii) that of directing the flow of the second heat transfer fluid along a peripheral part of the cell casing and along the passage towards the second collection chamber in respective zones distal from the fluid outlet passage from the second heat exchange chamber; and
iii) that of uniformly distributing the flow of the second heat transfer fluid in the second collection chamber defined downstream of the first and of the second separating element reducing to a maximum the dead zones within such a collection chamber that is traversed along the transversal direction in a substantially complete manner by the flow of the second heat transfer fluid.

The uniform and transversally directed flow thus obtained in the second heat exchange chamber advantageously allows to increase in a significant manner the heat exchange both with the first heat transfer fluid flowing in the second heat exchange portion of the heat exchanger, and with the rear wall of the first separating element positioned inside the heat exchanger itself and, this, together with an advantageous control of the axial dimension of the cell at the same thermal power.

In this regard, it is to be noted that the heat removed by the rear wall of the first separating element due to the action of the second heat transfer fluid which transversally flows in the zone of the second heat exchange chamber defined inside the heat exchanger is not wasted as happens in the case of cells of known type, but such a heat is transferred to the first heat transfer fluid flowing in the coils of the second heat exchange portion of the heat exchanger positioned downstream of the pair of axial separator baffles.

According to the invention, therefore, the heat exchange performance in the second heat exchange chamber of the cell is optimized thanks to the formation of a uniform and well distributed flow of the second heat transfer fluid, a feature which allows to increase the heat exchange efficiency of the cell and in particular—when desired—to increase the condensation effect thanks to an improved heat exchange between the second heat transfer fluid and all the elements of the cell present in the subdivided second heat exchange chamber and in heat exchange relationship with such a fluid (coils of the second heat exchange portion of the heat exchanger and rear wall of the first separating element, otherwise defined herein also as "internal partition element").

In this regard, the Applicant has experimentally found that the cell configuration according to the invention allows to improve the seasonal space heating energy efficiency is of the cell and, in particular, the active mode efficiency, $\eta son$, having a considerably major impact on the determination of the seasonal energy efficiency $\eta s$ of the cell.

The aforementioned seasonal space heating energy efficiencies $\eta s$ and $\eta son$ are in particular defined according to standard EN 15502-1:2012+A1:2015 paragraph 9.5.2 as follows:

$$\eta s = \eta son - \Sigma Fi \quad \eta son = 0.85 \cdot \eta 1 + 0.15 \cdot \eta 4$$

$$\eta 1 = \eta 30 \cdot Hi/Hs \quad \eta 4 = \eta 100 \cdot Hi/Hs$$

where:
ηs=seasonal space heating energy efficiency
Fi=corrective factors of the system as defined by the aforementioned standard in paragraph 9.5.2.2
ηson=seasonal space heating energy efficiency in active mode
η100=useful efficiency at nominal heat input Qn
η30=useful efficiency at 30% of the nominal heat input Qn
Hi/Hs=ratio of the Net to Gross Calorific Value for the appropriate gas family, (e.g.: methane=0.9; propane=0.923; butane=0.92).

During the experimental tests performed, the Applicant has in particular found that the configuration of the cell according to the invention allows to improve the seasonal space heating energy efficiency in active mode ηson of the cell by at least 1% with respect to the efficiency achieved by the cells of known type and provided with a partition element internal to the heat exchanger.

This increase in the seasonal space heating energy efficiency in active mode ηson appears to be particularly significant if it is considered that for most of the operating time the heat exchange cells do not operate at the maximum nominal thermal power but under so-called modulation conditions, in which the thermal power delivered is lower than the maximum value, precisely as shown by the formula for determining the seasonal space heating energy efficiency ηs reported above.

The Applicant has also experimentally found, by means of prolonged working tests adapted to simulate about 10 years of operation, that the subdivided configuration of the second heat exchange chamber of the cell according to the invention very advantageously allows to maintain the performance of the cell substantially unaltered over time, in particular when the cell is a heat exchange cell configured for use in fuel burning appliances for heating rooms, such as domestic boilers, in which the first heat transfer fluid is water to be heated and the second heat transfer fluid comprises hot combustion gases coming from a burner.

After a longer or shorter period of operation of a heat exchange cell of this type, in fact, the formation of scales (due to the gradual deposit over time of unburned particles) in the lower helically-shaped part of the heat exchanger is found in the zones facing the feeding zone of the second heat transfer fluid where the burner is located.

The Applicant has observed that these scales gradually obstruct the free passage cross-section of the combustion gases between the coils of the heat exchanger (in the lower zone thereof) to a value that can even reach 30% of the total internal circumference of the exchanger, with a significant reduction of the amount of heat energy that can be transferred to the first heat transfer fluid (the water to be heated flowing in the tubes of the exchanger).

Quite advantageously, the subdivided configuration of the second heat exchange chamber of the cell according to the invention allows—during the operation of the cell—to compensate the gradual reduction of the heat exchanged in the first heat exchange chamber with a corresponding gradual increase in the heat exchanged in the second heat exchange chamber of the cell.

This effect is due to the fact that, as disclosed above, the second heat transfer fluid is forced to flow in series and along a substantially transversal direction:

through the coils of the second heat exchange portion of the heat exchanger positioned upstream of the axial separator baffles,
along the zone of the second heat exchange chamber defined inside the heat exchanger, and
through the coils of the second heat exchange portion of the heat exchanger located downstream of the axial separator baffles.

In other words, the heat exchange cell according to the invention is advantageously capable to substantially completely recover in the second heat exchange chamber substantially all the heat not exchanged in the first heat exchange chamber due to the inevitable gradual deposit of scales on the radially internal part of the heat exchanger.

The Applicant has also experimentally found, by means of the aforementioned prolonged working tests, that when the heat exchange cell is configured for use in fuel burning appliances for heating rooms, the subdivided configuration of the second heat exchange chamber of the cell according to the invention advantageously allows to increase the recovery of the latent condensation heat of the combustion gases in the second heat exchange chamber i.e. in the side at the lowest temperature of the cell where the return water from the room heating system enters the cell.

From the tests performed by the Applicant, it was in particular found that the increased recovery of latent condensation heat of the combustion gases reaches such a high level at that an amount of condensate is obtained which can exert an effective "washing" action on the coils of the heat exchanger located in the second heat exchange chamber.

In other words, the heat exchange cell according to the invention is advantageously able to constantly keep clean the coils of the heat exchanger located in the second heat exchange chamber in which the first heat transfer fluid circulates at a lower temperature during the operation of the cell without having to resort to any special expedients.

The Applicant has then found that, with equivalent thermal power of the cell, it is possible to achieve the aforementioned advantageous effects with an encumbrance of the cell lower than that of the heat exchange cells described in European patent EP 0 678 186 and in International patent application WO 2011/092332.

Finally, it is to be noted that the aforementioned advantageous technical effects are achieved in a very significant way in all horizontal mounting configurations of the cell, which are those mostly used by manufacturers of water heating and air conditioning apparatus, due to the tendency of hot combustion gases to be directed towards the upper parts of the cell casing.

According to a second aspect thereof, the present invention relates to a heat exchange method between a first heat transfer fluid and a second heat transfer fluid in a heat exchange cell, said heat exchange cell comprising:
  a containment casing comprising a rear wall and a peripheral side wall,
  a helically-shaped heat exchanger comprising at least one tubular duct for the flow of a first heat transfer fluid coiled about a longitudinal axis of the helix according to a plurality of coils, said heat exchanger being mounted in said containment casing;
  a feeding zone of a second heat transfer fluid, intended for the heat exchange with said first heat transfer fluid, defined in the casing coaxially and internally with respect to said heat exchanger;
  a first heat exchange chamber, defined in said containment casing and in which a first heat exchange portion of the heat exchanger is housed, said first heat exchange chamber comprising a first collection chamber of the second heat transfer fluid externally defined with respect to the heat exchanger between a radially outer wall of the first heat exchange portion of the heat exchanger and the peripheral side wall of the containment casing;

a second heat exchange chamber, defined in said containment casing and in which a second heat exchange portion of the heat exchanger is housed, said second heat exchange chamber comprising a first collection chamber of the second heat transfer fluid externally defined with respect to the heat exchanger between a radially outer wall of the second heat exchange portion of the heat exchanger and the peripheral side wall of the containment casing;

a fluid outlet passage from the second heat exchange chamber defined in the peripheral side wall of the containment casing near the rear wall of said casing;

wherein said first and second heat exchange chambers are separated inside the heat exchanger by a first separating element comprising a substantially plate-shaped body;

wherein said first and second heat exchange chambers are separated outside the heat exchanger by at least one second separating element, radially extending between the radially outer wall of the heat exchanger and the peripheral side wall of the containment casing, said second separating element being circumferentially extended about the heat exchanger at least at said fluid outlet passage from the second heat exchange chamber so as to define at least one fluid passage between the first and the second collection chambers of the second heat transfer fluid;

wherein the method comprises the steps of:
feeding the second heat transfer fluid in said feeding zone;
carrying out in the first heat exchange chamber a first heat exchange between the second heat transfer fluid and the first heat transfer fluid flowing in the first heat exchange portion of the heat exchanger by flowing through the coils of the heat exchanger positioned in the first heat exchange chamber;
collecting the second heat transfer fluid in said first collection chamber of the second heat transfer fluid defined in the first heat exchange chamber external to the heat exchanger;
sending the second heat transfer fluid from said first to said second heat exchange chamber by means of said at least one fluid passage formed between the first collection chamber of the second heat transfer fluid and at least a first portion of the second collection chamber of the second heat transfer fluid, said first portion of the second collection chamber being externally defined with respect to the heat exchanger in a first portion of the second heat exchange chamber upstream of a pair of axial separator baffles axially extending between said second separating element and the rear wall of the containment casing;
carrying out in the second heat exchange chamber a second heat exchange between the second heat transfer fluid and the first heat transfer fluid flowing in the second heat exchange portion of the heat exchanger by flowing through the coils of the heat exchanger positioned in said at least a first portion of the second heat exchange chamber;
carrying out in the second heat exchange chamber a third heat exchange between the second heat transfer fluid and said first separating element by crossing along a substantially transversal direction a zone of the second heat exchange chamber defined inside the heat exchanger;
carrying out in the second heat exchange chamber a fourth heat exchange between the second heat transfer fluid and the first heat transfer fluid flowing in the second heat exchange portion of the heat exchanger by flowing through the coils of the heat exchanger positioned in a second portion of the second heat exchange chamber defined downstream of said pair of axial separator baffles; and
discharging the second heat transfer fluid from the second heat exchange chamber along a direction substantially perpendicular to a longitudinal axis of the heat exchange cell through said fluid outlet passage from the second heat exchange chamber;

and wherein said first, second, third and fourth heat exchanges are carried out in series with each other.

Advantageously, the heat exchange method of the invention achieves the technical effects described above in relation to the heat exchange cell.

According to a third aspect thereof, the present invention relates to a heating or air conditioning apparatus comprising a heat exchange cell as defined in the present description.

The present invention in at least one of the aforementioned aspects may have at least one of the following preferred features; the latter may in particular be combined with one another as desired in order to meet specific application needs.

In one preferred embodiment, the helically-shaped heat exchanger comprises at least one smooth tubular duct, i.e. without heat exchange fins extending from the outer surface thereof.

In this way, it is advantageously possible to limit any drop in the heat exchange performance connected with the accumulation of incrustations in proximity to the contact zone between the heat exchange fins and the outer surface of the tubular duct, a zone that is in practice difficult to clean.

In a preferred embodiment, the tubular duct of the heat exchanger has a cross section with a flattened shape, preferably at least partially oval.

Preferably, the coils of the aforementioned plurality of coils of the tubular duct of the heat exchanger have a flattened cross section whose main axis is substantially perpendicular to the longitudinal axis of the helix of the exchanger.

In a further preferred embodiment and for the purpose of satisfying specific application requirements, the main axis of the flattened cross section of the coils of the tubular duct of the heat exchanger is inclined with respect to the longitudinal axis of the helix. Preferably, the angle of inclination is comprised between 60° and 87°.

Preferably, when the heat exchanger comprises inclined coils, the heat exchange cell is mounted vertically inside a heating or air conditioning apparatus so as to facilitate the outflow of condensate from the interstices defined between adjacent coils of the heat exchanger.

In a preferred embodiment, the peripheral side wall of the casing contains and laterally delimits the heat exchanger and the first collection chamber of the second heat transfer fluid substantially seamlessly.

Within the context of the present description and following claims, such preferred characteristic indicates that the peripheral side wall of the containment casing is free from openings configured to allow a substantial flow of second heat transfer fluid towards a direct outlet opening of the latter outside the cell, thus substantially by-passing the second collection chamber.

Preferably, the first separating element mounted inside the heat exchanger is configured to structurally separate the second heat exchange chamber from the first heat exchange chamber, in particular from the feeding zone of the second heat transfer fluid defined coaxially and internally to the heat exchanger.

In the preferred embodiment in which the cell is a gas-liquid heat exchange cell for water heating apparatuses, the second heat transfer fluid preferably comprises the combustion gases of a burner housed in a feeding zone that will also be indicated within the context of the present description by the term "combustion chamber".

According to the invention, the second separating element extending radially between the radially outer wall of the heat exchanger and the peripheral side wall of the containment casing is configured to structurally separate the second heat exchange chamber from the first heat exchange chamber at least at the aforementioned fluid outlet passage from the second heat exchange chamber.

Preferably, the second separating element has a circumferential extension around the heat exchanger having a predefined value and preferably such as to prevent a direct passage of most of the flow of the second heat transfer fluid towards the aforementioned fluid outlet passage from the second heat exchange chamber.

Preferably, the second separating element has a circumferential extension around the heat exchanger defined by an angle, the vertex of which is positioned on the longitudinal axis of the heat exchanger, comprised between 25° and 200°, more preferably, between 50° and 180°.

Within the context of the present description and following claims, all the numerical magnitudes indicating quantities, parameters, percentages, and so on are to be considered preceded in every circumstance by the term "about" unless indicated otherwise. Further, all the ranges of numerical magnitudes include all the possible combinations of maximum and minimum numerical values and all the possible intermediate ranges, as well as those specifically indicated.

For the purposes of the invention, the second separating element is configured in any shape and thickness suitable for the purpose of structurally separating the second heat exchange chamber from the first heat exchange chamber outside the heat exchanger.

In a preferred embodiment, the second separating element is made of a suitable structural material, such as a metal like steel or aluminium or a high performance and heat resistant plastic material, such as polyphenylene sulfide (PPS), possibly filled with fibres of a functional filler, e.g. glass fibres.

The shape of the second separating element depends on the shape of the containment casing of the heat exchange cell.

In a preferred embodiment, the second separating element is substantially shaped like a sector of a circular crown.

In a preferred embodiment, the second separating element is configured to close at least 90%, more preferably at least 92%, even more preferably at least 95% of the cross-sectional area of the first collection chamber of the second heat transfer fluid defined in a radially external position to the heat exchanger in the first heat exchange chamber.

In a particularly preferred embodiment, the second separating element is configured to substantially completely close (substantially 100%), apart from the inevitable leakages due to the processing tolerances of the various components of the cell, the cross section of the first collection chamber of the second heat transfer fluid.

In this preferred embodiment, therefore, the second separating element extends radially between the radially outer wall of the heat exchanger and the peripheral side wall of the containment casing and is configured so as to abut substantially against the peripheral side wall of the containment casing or against the radially outer wall of the heat exchanger according to its specific realization, as will appear more clearly below.

Even more preferably, the second separating element is configured so as to abut against the peripheral side wall of the containment casing or against the radially outer wall of the heat exchanger with a substantial fluid seal.

Thanks to these preferred embodiments, it is advantageously possible to substantially limit and, more preferably, substantially prevent (again notwithstanding the inevitable leakages due to processing tolerances), fluid communication between the first and the second heat exchange chamber at least at the fluid outlet passage from the latter second heat exchange chamber.

For the purposes of the invention, any leakages of the second heat transfer fluid at the second separating element, often inevitable in mass production due to the processing tolerances of such element and of the containment casing of the cell, are anyway acceptable because (and to the extent that) they do not appreciably alter the barrier function to the passage of gas of the second separator.

Preferably, the second separating element is configured to allow a peripheral flow of the second heat transfer fluid inside the containment casing of the cell towards the second heat exchange chamber along a direction substantially parallel to the peripheral side wall of the casing and adjacent thereto.

Thanks to this preferred embodiment of the second separating element, the heat exchange method of the invention preferably comprises the step of sending the second heat transfer fluid from the first towards the second heat exchange chamber substantially parallel to the peripheral side wall of the casing and in proximity thereto through the aforementioned at least one passage of fluid formed between the radially outer wall of the heat exchanger and the peripheral side wall of the containment casing and between the first and the second collection chamber of the second heat transfer fluid defined externally to the heat exchanger.

The Applicant has experimentally found that by appropriately adjusting the circumferential extension of the second separating element it is possible to achieve the further advantageous technical effect of optimizing the fluid dynamics of the second heat transfer fluid—which substantially radially or axially-radially crosses towards the outside of the heat exchanger in the first heat exchange chamber—substantially along the whole axial extension of the first heat exchange portion of the heat exchanger and substantially along the whole circumferential extension of this first portion.

In this way, it is advantageously possible to significantly reduce preferential fluid paths, improving the distribution of the flow of the second heat transfer fluid in crossing the coils of the heat exchanger positioned upstream of the second separating element.

In particular, the Applicant has found that the flow rate of the second heat transfer fluid that radially or axially-radially crosses the first heat exchange portion of the heat exchanger passing into the interstice defined between coils can be made substantially constant along the axial section of such first heat exchange portion of the heat exchanger itself.

The Applicant also considers that such flow rate is made substantially constant also along the circumferential extension of the first heat exchange portion of the heat exchanger so that the second heat transfer fluid transits uniformly in the first annular collection chamber along the circumferential extension of such first heat exchange portion, significantly reducing the presence of dead zones not travelled by the fluid in the first collection chamber.

The Applicant has also experimentally found that by appropriately defining the circumferential extension of the second separating element it is also possible to optimize the fluid dynamics of the second heat transfer fluid in crossing the first collection chamber in the part of the cell upstream of the second separating element (the first heat exchange chamber) and in the passage towards the second collection chamber in the part of the cell downstream of the second separating element (the second heat exchange chamber).

Preferably the heat exchange method of the invention therefore comprises the step of adjusting the fluid dynamics of the second heat transfer fluid sent towards the second heat exchange chamber by adjusting the overall cross-sectional area of fluid flow of said at least one passage formed between the radially outer wall of the heat exchanger and the peripheral side wall of the containment casing.

As mentioned, this step is actually realized by appropriately defining the circumferential extension of the second separating element.

The Applicant has found that, by optimizing in this way the fluid dynamics of the second heat transfer fluid and therefore the heat exchange between such fluid and the heat exchanger, it is advantageously possible to increase the heat exchange efficiency of the cell without any increase in the dimensions of the heat exchanger—in particular along the axial direction—with a consequent advantageous reduction in costs, consumption of material and encumbrance both of the exchanger and of the heat exchange cell that contains it.

In a preferred embodiment, the cross-sectional area of fluid flow of said at least one fluid passage between the first and the second collection chamber of the second heat transfer fluid defined by the second separating element is uniformly distributed along the peripheral side wall of the containment casing.

In this way, it is advantageously possible to uniformly distribute the second heat transfer fluid along the circumferential direction optimizing the fluid dynamics thereof.

In a preferred embodiment, the second separating element is circumferentially extending substantially astride of a longitudinal centerline plane of the passage allowing a fluid outlet from the second heat exchange chamber.

In this way and thanks to this symmetrical configuration of the second separating element with respect to the aforementioned longitudinal centerline plane of the fluid outlet passage, it is advantageously possible to have a balanced and symmetrical distribution of the flow of second heat transfer fluid in the passage from the first collection chamber towards the second collection chamber of the second heat transfer fluid itself.

In a preferred embodiment, the second separating element is extending circumferentially around the heat exchanger at the first separating element.

In this way, it is advantageously possible to have substantial structural continuity between the first and the second separating element that advantageously contributes to separating the first and the second heat exchange chamber substantially with a gas seal (except for the inevitable leakages due to processing tolerances).

In a preferred embodiment, the first separating element comprises an annular crown at least partially interposed between the coils of the first heat exchange portion and the coils of the second heat exchange portion of the heat exchanger.

In a preferred embodiment, the second separating element extends radially from the aforementioned annular crown of the first separating element to which it can be connected in any appropriate way.

More preferably, the second separating element extends radially for the entire extension along the radial direction of the coils of the heat exchanger.

In a preferred embodiment, the first separating element and, more preferably, the aforementioned annular crown thereof, is made of a metal material with high heat conductivity, such as steel or aluminium.

Thus, for example, it is advantageously possible to make the first and the second separating elements as a single piece.

In this way, it is advantageously possible to achieve the following particularly appreciable technical effects:
  avoiding any leakages at the interface along the radial direction between the first and the second separating element; and
  reducing the number of components necessary for realizing the heat exchange cell, with an advantageous reduction in the production and assembly costs of the cell itself.

In an alternative preferred embodiment, the second separating element can extend radially from the peripheral side wall of the containment casing of the cell.

In this case, it is advantageously possible to simplify the realization of the first separating element and to make the second separating element as a single piece with or fix it to the peripheral side wall of the containment casing of the cell, an operation that can be performed relatively easily for example when such containment casing is made by the moulding of a suitable plastic material, for example and preferably a high performance and heat resistant plastic material (e.g. PPS).

In a preferred embodiment, the substantially plate-shaped body of the first separating element is centrally provided with a heat-insulating element facing the feeding zone of the second heat transfer fluid.

Preferably, such heat-insulating element is substantially disc-shaped.

Advantageously, the heat-insulating element allows suitable heat insulation to be obtained between the feeding zone of the second heat transfer fluid, which can have a very high temperature, and the second heat exchange chamber of the cell, in which the second heat transfer fluid flows once it has yielded most of its initial heat.

More preferably, the heat-insulating element is housed in a respective housing seat centrally formed in the body of the separating element.

Preferably, the heat-insulating element is totally housed coaxially and internally to the heat exchanger.

In this way, it is advantageously possible to thermally insulate the feeding zone of the second heat transfer fluid—which is the hottest part of the cell—from the second heat exchange chamber and from the rear wall of the containment casing both by increasing the condensing capacity of the second heat exchange chamber, where desired, and by thermally protecting the material of which the containment casing is made.

In a preferred embodiment, the annular crown of the first separating element, where provided, extends at least partially in a spiral substantially with the same winding pitch as the coils of the heat exchanger.

Thanks to the at least partially spirally shaped extension of the annular crown of the first separating element, it is also advantageously possible to achieve the aforementioned increase in heat exchange efficiency of the cell at the same time minimizing the axial dimensions of the cell itself.

Preferably, the housing seat of the heat-insulating element comprises a rear wall internally provided with at least one raised spacer configured to keep the disc at a predefined distance from the rear wall of the housing seat.

In this way, advantageous heat insulation is obtained between the bottom of the housing seat and the heat-insulating element that has a high temperature as it borders onto the feeding zone of the second heat transfer fluid, e.g. a combustion chamber of the cell where high temperature combustion gas is generated (second heat transfer fluid). This heat dispersion towards the rear wall of the housing seat of the heat-insulating element is reduced.

In a preferred embodiment, the first separating element comprises a plurality of heat exchange protrusions extending from a rear face thereof facing towards the rear wall of the casing.

In this way, it is advantageously possible to increase the exchange surface area of the first separating element, therefore increasing the amount of heat exchange between the second heat transfer fluid and the heat exchange portion of the first separating element inside the second heat exchange chamber.

When the first separating element has this preferred configuration, the heat exchange method of the invention preferably comprises the step of increasing the amount of the second heat exchange carried out in the second zone of the second heat exchanger by means of the aforementioned plurality of heat exchange protrusions.

Preferably, the heat exchange protrusions are substantially pin and/or fin shaped so as to maximize the heat exchange surface area.

In a preferred embodiment, the aforementioned axial separator baffles extending axially between the second separating element and the rear wall of the containment casing of the cell extend radially between a radially outer wall of the second heat exchange portion of the heat exchanger and the peripheral side wall of the casing.

In this way, it is advantageously possible to achieve in a structurally simple way the desired configuration of the partition walls adapted to suitably subdivide the second heat exchange chamber and to separate from each other the first and the second portion of the second collection chamber of the second heat transfer fluid defined respectively upstream and downstream of the axial separator baffles.

In a preferred embodiment, the axial separator baffles are made of a suitable structural material, such as a metal like steel or aluminium or a high performance and heat resistant plastic material, such as PPS.

In a preferred embodiment, the axial separator baffles are fixed to the second separating element in any appropriate way.

Thus, for example, the axial separator baffles can be formed as a single piece with the second separating element.

In this case, it is advantageously possible to achieve structural continuity between the second separating element and the axial separator baffles which in turn allows the following particularly appreciable technical effects to be achieved:

preventing any leakages at the interface between the second separating element and the axial separator baffles along a circumferential direction in a radially external position to the second heat exchange portion of the heat exchanger; and reducing the number of components necessary for realizing the heat exchange cell, with an advantageous reduction in the production and assembly costs of the cell itself.

In an alternative preferred embodiment, the axial separator baffles can extend radially from the peripheral side wall of the containment casing of the cell.

In this case, it is advantageously possible to simplify the realization of the axial separator baffles and make them as a single piece with or fix them to the peripheral side wall of the containment casing of the cell, an operation that can be performed relatively easily for example when such containment casing is made by the moulding of a suitable plastic material, for example and preferably a high performance and heat resistant plastic material (e.g. PPS).

In further preferred embodiments, it is advantageously possible to combine—as a function of the specific construction and use requirements—the realization configurations of the first separating element, of the second separating element and of the axial separator baffles described above.

Thus, it is possible to fix or make as a single piece between them the first separating element, the second separating element and the axial separator baffles, i.e. it is possible to fix to, or make as a single piece with the peripheral side wall of the containment casing of the cell, one or more from the second separating element and the axial separator baffles, or it is possible to fix one or more of the second separating element and the axial separator baffles to such peripheral side wall.

In a preferred embodiment, the axial separator baffles are configured to close at least 90%, more preferably at least 92%, even more preferably at least 95% of the cross-sectional area of the second collection chamber of the second heat transfer fluid defined in a radially outer position to the heat exchanger in the second heat exchange chamber.

In a particularly preferred embodiment, the axial separator baffles are configured to substantially completely close (substantially 100%), apart from the inevitable leakages due to the processing tolerances of the various components of the cell, the cross section of the second collection chamber of the second heat transfer fluid.

Therefore, in this preferred embodiment, the axial separator baffles are axially extending between the second separating element and the rear wall of the containment casing of the cell substantially along the entire axial development of the second collection chamber of the second heat transfer fluid defined in the second heat exchange chamber.

Even more preferably, the axial separator baffles extend in the second collection chamber of the second heat transfer fluid so as to substantially abut against the rear wall of the containment casing of the cell.

In this way, it is advantageously possible to substantially limit and, more preferably, substantially prevent (still notwithstanding the inevitable leakages due to processing tolerances), fluid communication between the first and the second portion of the second collection chamber of the second heat transfer fluid defined respectively upstream and downstream of the axial separator baffles.

In these preferred embodiments, it is therefore advantageously possible to appropriately close the second portion of the second collection chamber of the second heat transfer fluid defined externally to the second heat exchange portion of the heat exchanger downstream of the axial separator baffles.

In doing so, it is advantageously possible to maximize the advantageous technical effects disclosed above and connected to the fluid dynamics which can be imparted to the second heat transfer fluid in the heat exchange cell according to the invention.

Thus, for example, it is advantageously possible to substantially divert the whole flow of second heat transfer fluid towards the coils of the heat exchanger positioned in the first portion of the second heat exchange chamber defined upstream of the axial separator baffles.

In this way, it is possible to achieve an advantageous increase in the amount of the second, third and fourth heat exchange between the second heat transfer fluid and:
 i) the coils of the heat exchanger positioned in the first portion of the second heat exchange chamber defined upstream of the axial separator baffles,
 ii) the first separating element (or better the rear face thereof) positioned inside the heat exchanger, and
 iii) the coils of the heat exchanger positioned in the second portion of the second heat exchange chamber defined downstream of the axial separator baffles.

All this happens with an increase in seasonal space heating energy efficiency ηs of the cell, in particular efficiency in active mode ηson and maintaining over time the performance characteristics of the cell as set out above.

In a preferred embodiment, the second portion of the second collection chamber of the second heat transfer fluid defined downstream of said axial separator baffles is circumferentially extending about the heat exchanger for a portion having an angular extension equal to or less than the circumferential extension of said second separating element.

Advantageously, this preferred characteristic can be conveniently achieved through the appropriate positioning of the axial separator baffles along the circumferential extension of the second collection chamber of the second heat transfer fluid.

Thus, for example, in a preferred embodiment, the axial separator baffles are extending axially from opposing end edges of the second separating element so that the circumferential extension of the second collection chamber of the second heat transfer fluid is substantially equal to the circumferential extension of the second separating element.

In a preferred alternative embodiment, and for a given circumferential extension of the second separating element, the axial separator baffles can be positioned along the circumferential extension of the second separating element in an appropriate position and adapted to determine the desired extension of the first and of the second portion of the second collection chamber of the second heat transfer fluid (bi-univocally correlated to each other) defined upstream and downstream of the axial separator baffles.

Preferably, the axial separator baffles are symmetrically positioned with respect to a centerline plane of the second separating element.

In this way, it is advantageously possible to have a balanced and symmetrical distribution of the flow of the second heat transfer fluid in the crossing of the first portion of the second collection chamber of the second heat transfer fluid and in the subsequent crossing of the coils of the heat exchanger positioned immediately downstream of such first portion of the second collection chamber.

In a preferred embodiment of the invention and thanks to the configuration of the second separating element and of the axial separator baffles, cooperating with each other in subdividing (preferably in a substantially gas-tight manner save for, as mentioned, inevitable leakages) the second heat exchange chamber of the cell, it is therefore advantageously possible to vary (and determine during the manufacturing of the heat exchange cell) the circumferential extension of the first and of the second portion of the second collection chamber of the second heat transfer fluid as a function of the fluid dynamic characteristics and the heat exchange characteristics that are to be obtained in the second heat exchange chamber of the cell.

Thus, for example, it is possible to vary the circumferential extension of the first and of the second portion of the second collection chamber of the second heat transfer fluid by varying the circumferential extension of the second separating element and positioning the axial separator baffles at the opposing ends of the second separating element.

Alternatively, and for a given circumferential extension of the second separating element, such adjustment can be achieved, as set out above, by positioning the axial separator baffles in an appropriate position along the circumferential extension of the second separating element.

In yet another alternative, it is possible to combine these two geometric configuration modes of the second separating element and of the axial separator baffles.

In a preferred embodiment, the method of the invention comprises the step of adjusting the amount of the second and fourth heat exchange, carried out between the second heat transfer fluid and the first heat transfer fluid flowing in the second heat exchange portion of the heat exchanger by flowing through the coils of the heat exchanger positioned in said at least one first and, respectively, in said second portion of the second heat exchange chamber, by adjusting the circumferential position of said axial separator baffles along the radially outer wall of the heat exchanger.

In this preferred embodiment, the cell and the heat exchange method of the invention enable the determination during the design stage, and for a given thermal power of the cell, of both the fluid dynamics of the second heat transfer fluid and the amount of heat exchange that takes place between such fluid and the first heat exchange fluid flowing in the coils of the heat exchanger in the zones of the second heat exchange chamber upstream and downstream of the axial separator baffles.

In this way, the amount of cooling of the second heat transfer fluid that takes place by the first heat transfer fluid flowing in the coils of the heat exchanger positioned in the first portion of the second heat exchange chamber upstream of the axial separator baffles can be advantageously determined, therefore adjusting the amount of residual heat that can subsequently be exchanged between the second heat transfer fluid and the rear wall of the first separating element and the coils of the heat exchanger positioned in the second portion of the second heat exchange chamber downstream of the axial separator baffles.

The Applicant has experimentally found that thanks to these advantageous characteristics, the heat exchange that takes place in the second heat exchange chamber of the cell can be optimized so as to increase the total seasonal space heating energy efficiency is of the cell, and in particular the efficiency in active mode ηson, with respect to cell configurations of the prior art.

In particular, the Applicant has experimentally found a significant increase in the performance of the heat exchange cell in the condensation of the combustion gases in the event that the cell is a water heating apparatus.

Preferably, the heat exchange cell is horizontally mounted inside a containment casing of said apparatus.

Preferably, the heat exchange cell is a condensation heat exchange cell or a heat recovery device.

BRIEF DESCRIPTION OF THE FIGURES

Further characteristics and advantages of the present invention will appear more clearly from the following detailed description of a preferred embodiment thereof, made with reference to the appended drawings.

The different characteristics in the individual preferred configurations of the cell may be combined with one another as desired according to the preceding description, should there be advantages specifically resulting from a specific combination.

In such drawings:

FIG. 1 is a perspective view, partially in detached parts and with some details omitted, of a preferred embodiment of a heat exchange cell according to the present invention;

FIGS. 2a and 2b are plan views respectively from above and from below of the heat exchange cell of FIG. 1;

FIG. 3 is a perspective view in detached parts of the heat exchange cell of FIG. 1;

FIG. 4 is a longitudinal sectional view parallel to the axis A-A of the heat exchange cell of FIG. 1 according to the line IV-IV of FIG. 2a;

FIG. 5 is a cross sectional view orthogonal to the axis A-A of the heat exchange cell of FIG. 1 according to the line V-V of FIG. 2b;

FIG. 6 is a perspective view from the rear side of the heat exchange cell of FIG. 1 in partial section and with some details omitted.

DETAILED DESCRIPTION OF CURRENTLY PREFERRED EMBODIMENTS OF THE INVENTION

Figure 1:
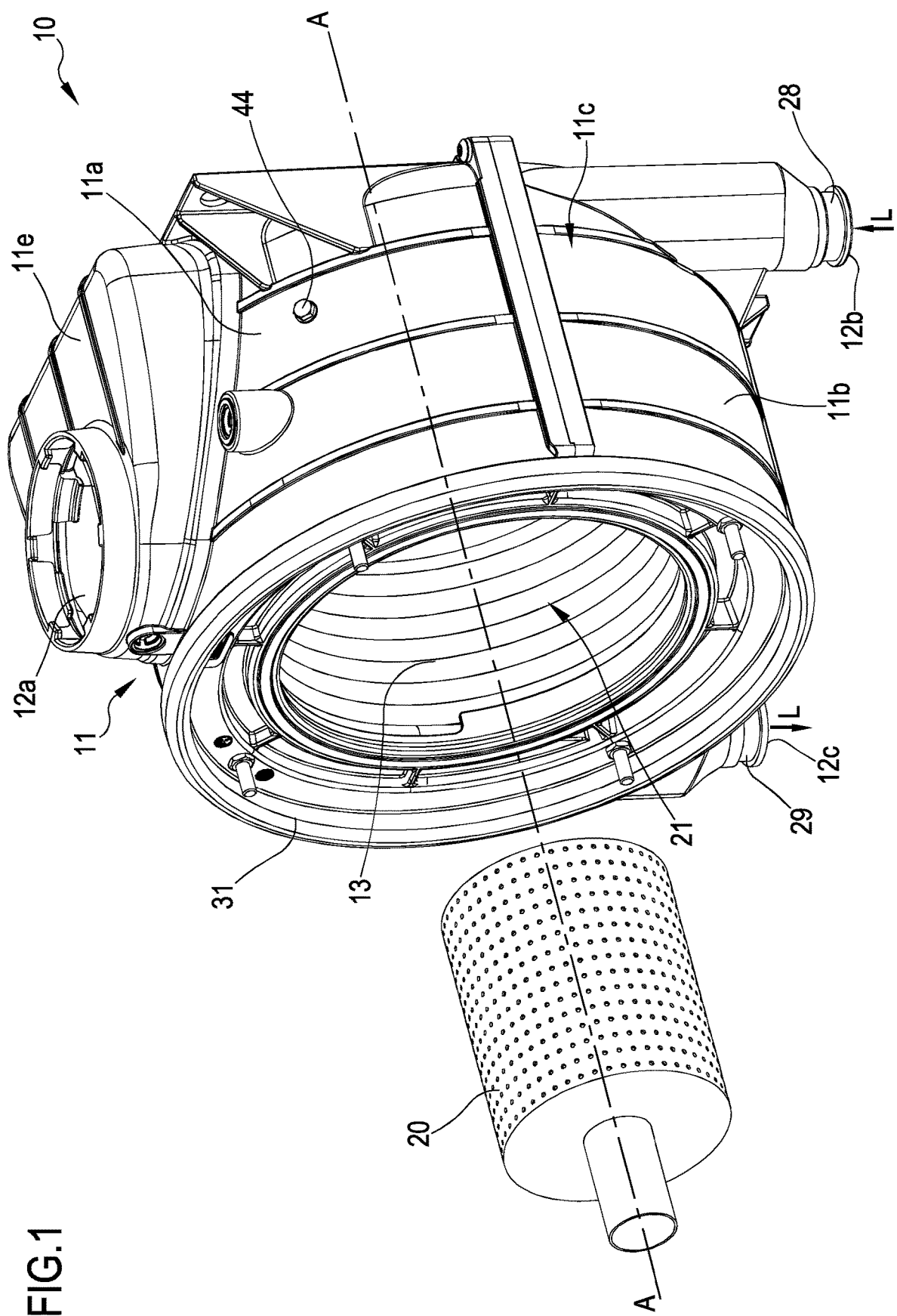

For the illustration of the drawings, use is made in the following description of identical numerals to indicate construction elements with the same function. Moreover, for clarity of illustration, certain numerical references are not repeated in all the figures.

With reference to the figures, a heat exchange cell is shown, indicated overall with number 10.

In the preferred embodiment illustrated in the figures, the heat exchange cell 10 is a gas-liquid heat exchange cell of the so-called condensation type wherein there is an exchange of heat between a first heat transfer fluid, e.g. comprising water to be heated, and a second heat transfer fluid e.g. comprising hot combustion gases coming from a burner shown by number 20 in the appended figures.

With particular reference to the preferred embodiment illustrated in the figures, the heat exchange cell 10 comprises a containment casing 11 in which a helically-shaped heat exchanger 13 is mounted.

Within the scope of this detailed description and for descriptive simplicity, reference will conventionally be made without any limiting intention to an operating position of the heat exchange cell 10 in which the longitudinal axis A-A of the heat exchanger 13 (that coincides and also represents the longitudinal axis of the cell 10) is horizontal.

Preferably, the containment casing 11 is made of a structural material suitable for this type of use, such as a metal material, for example steel or aluminium, or a high performance and heat resistant plastic material, such as polyphenylene sulfide (PPS), possibly filled with fibres of a functional filler, e.g. glass fibres.

Figure 3:
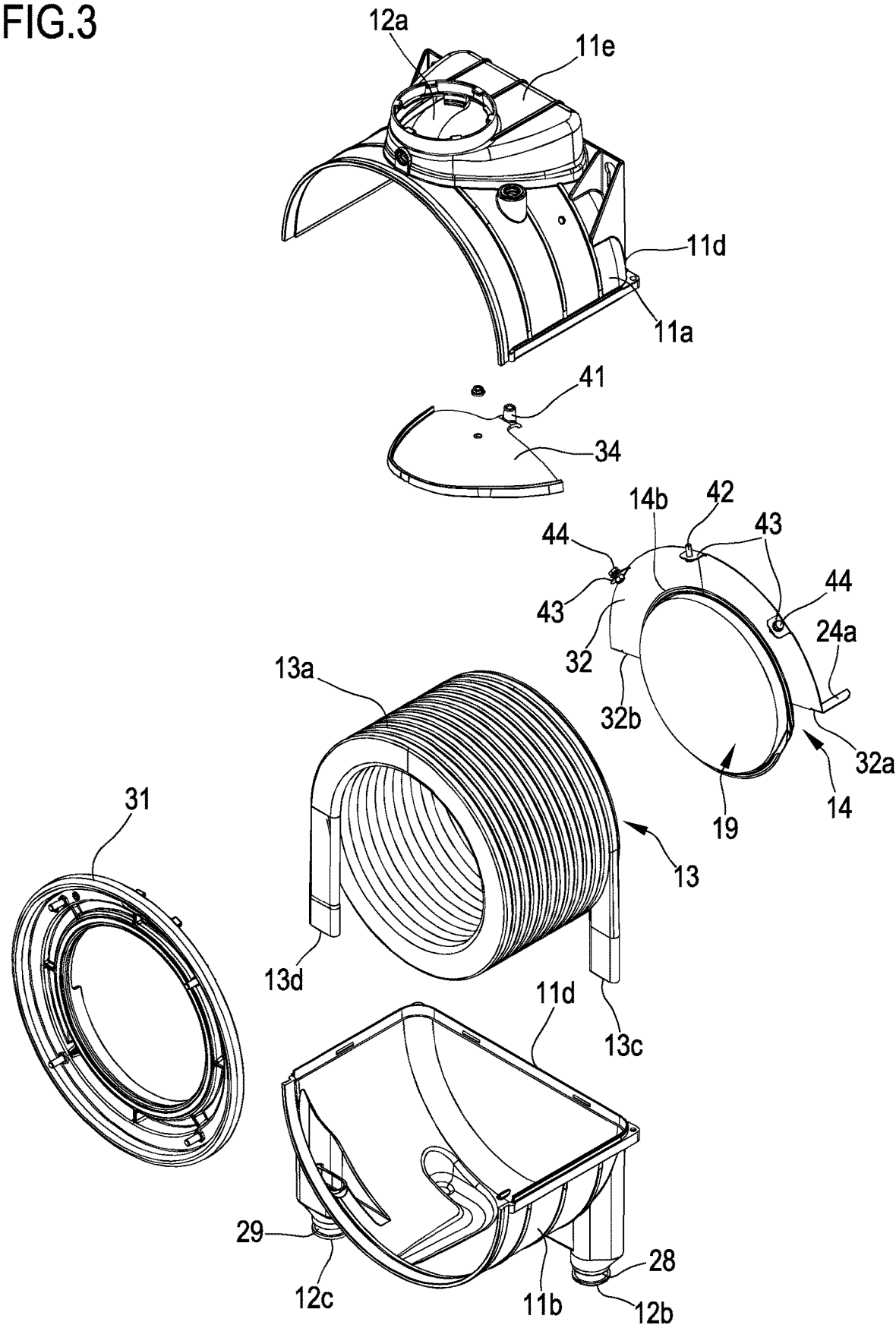

The heat exchanger 13 preferably comprises a tubular duct for the flow of a first heat transfer fluid coiled about a longitudinal axis A-A according to a plurality of coils starting and ending respectively at an inlet opening 13c and outlet opening 13d of the first heat transfer fluid (see FIG. 3).

Preferably, the heat exchanger 13 is made of a metal material with high heat conductivity, such as steel or aluminium.

The inlet openings 13c and outlet openings 13d of the first heat transfer fluid are configured so as to allow respectively the inlet and the outlet of the first heat transfer fluid (water to be heated) into/out of the heat exchanger 13. The inlet and outlet directions of the first heat transfer fluid are indicated in the figures by the arrow L.

Figure 4:
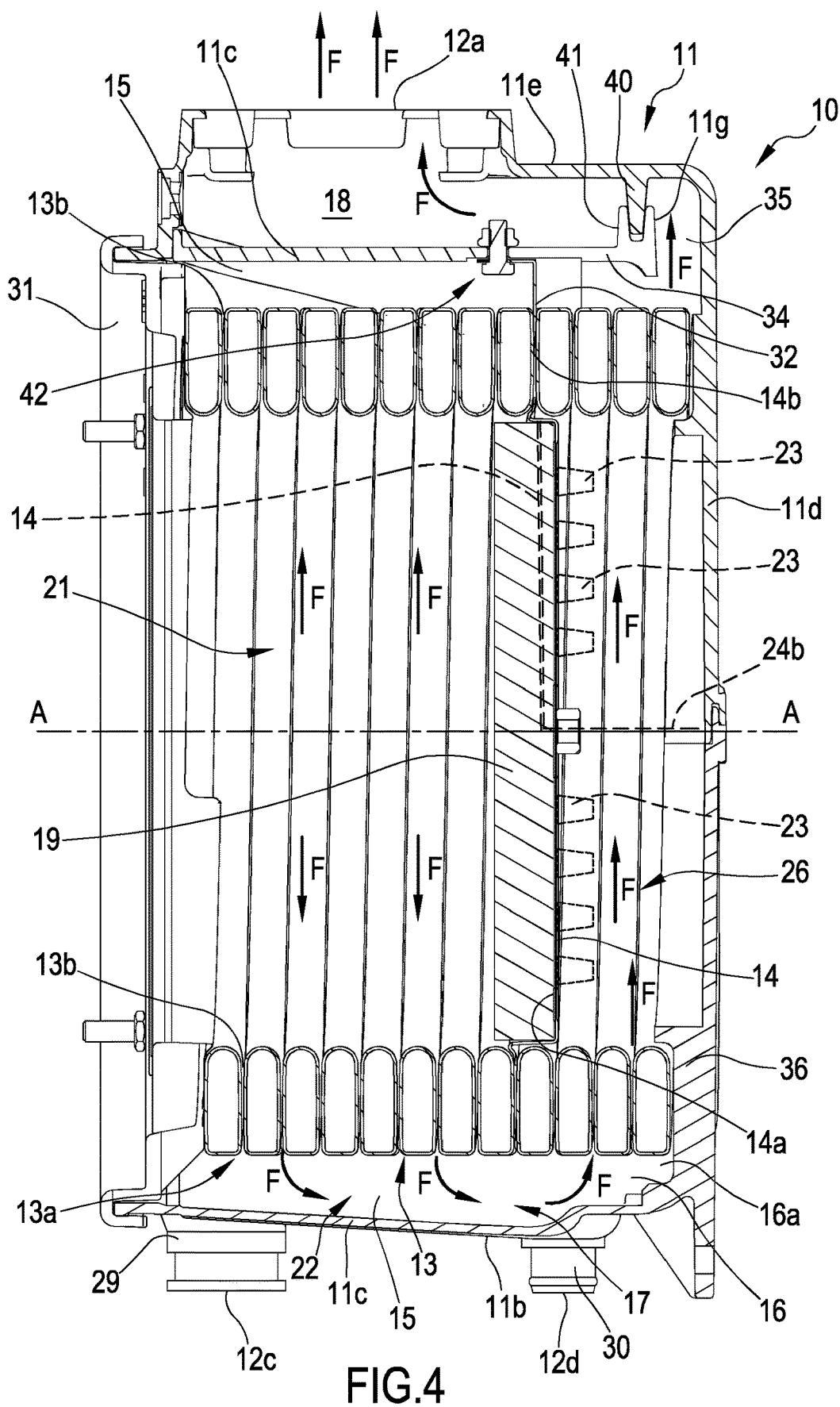

In the preferred embodiment illustrated, the tubular duct has a flattened cross section, preferably with a partially oval shape (see FIGS. 3 and 4).

Preferably, the coils of the aforementioned plurality of coils of the tubular duct of the heat exchanger 13 have a flattened cross section whose main axis is substantially perpendicular to the longitudinal axis A-A of the heat exchanger 13.

In a further preferred embodiment (not shown) and for the purpose of satisfying specific application requirements, the main axis of the flattened cross section of the coils of the tubular duct of the heat exchanger 13 can form an acute angle, e.g. comprised between 60° and 87°, with respect to the longitudinal axis A-A of the heat exchanger 13.

Between the flat surfaces of two successive coils of the tubular conduit there is an interstice 13b, preferably with a substantially constant thickness, forming a fluid path for the passage of the second heat transfer fluid along a substantially radial direction (or substantially axial-radial in the event of inclined coils), having a predefined and preferably constant thickness.

For that purpose, the cell 10 is preferably provided with suitable spacer elements, not better represented in the figures, such as protrusions extending from the flat faces of the tubular duct or comb-shaped spacer elements interposed between the aforementioned flat faces and configured to define the interstice 13b between the flat faces of the tubular duct.

Within the scope of the present description and the following claims, the term: "thickness" of the interstice defined between the flat faces of the duct of the heat exchanger 13 means the distance between said faces measured along the perpendicular direction thereto.

Preferably, the helically shaped heat exchanger 13 is mounted inside the containment casing 11 so as to define in such casing a feeding zone 21 of the second heat transfer fluid, in this case comprising the hot combustion gases generated by the burner 20.

Preferably, the feeding zone 21 of the second heat transfer fluid is defined in the containment casing 11 coaxially and internally to the heat exchanger 13.

In this way, it is advantageously possible to have a configuration such as to have inside the heat exchange cell 10 a flow of the second heat transfer fluid that goes from the feeding zone 21 radially (or along the substantially axial-radial direction in the case of inclined coils) towards the outside through the interstices 13b defined between the coils of the helically-shaped heat exchanger 13.

The containment casing 11 of this preferred embodiment of the cell 10 is sealingly closed at the front by a substantially annular front wall, conventional in itself of which for simplicity purposes a first annular element 31 fixed to the peripheral side wall 11c is shown.

Preferably, the front wall comprises a second annular element, not shown, removably sealingly fixed to the first annular element 31 at a peripheral inner edge thereof in a way that is known per se, e.g. through an O-ring (also not shown).

A support plate, conventional per se and also not shown, of burner 20 is fixed onto the front, substantially annular wall of the cell 10 in a removable yet still gas-sealed way.

Preferably, the cell 10 also comprises a substantially annular heat insulating element—again not illustrated for simplicity purposes—facing the feeding zone 21 of the second heat transfer fluid and configured to thermally protect the material of which the front wall of the containment casing 11 is made from the feeding zone 21 of the second heat transfer fluid at high temperature.

In the preferred embodiment illustrated, the containment casing 11 has in particular a substantially cylindrical conformation and comprises two half-shells 11a, 11b, respectively upper and lower, appropriately shaped so as to define a peripheral side wall 11c and a rear wall 11d of the containment casing 11.

In the preferably horizontal operating configuration, the heat exchange cell 10 is in fluid communication with external components (not shown), being part of the apparatus or of the system in which the cell is mounted, through a plurality of openings 12a-12d, preferably formed on the side wall 11c of the containment casing 11 or in further elements associated therewith.

Thus, in the preferred embodiment illustrated, a first opening 12a is configured for the outlet of the second heat transfer fluid from the cell 10 and is preferably formed in an discharge cap 11e of such fluid externally associated with the peripheral side wall 11c of the containment casing 11.

Preferably and as will appear more clearly below, the discharge cap 11e is formed as a single piece in the half-shell 11a (the upper one in the exemplifying horizontal mounting configuration of the cell 10) so as to simplify the manufacturing of the cell 10 by appropriately reducing the number of elements of the cell 10 and simplifying the assembly operations thereof.

In the preferred operating configuration (horizontal) of the preferred embodiment of the heat exchange cell 10 shown in FIG. 1, the outlet opening 12a is preferably positioned so as to have a vertical axis and to be facing upwards.

Second and third openings 12b, 12c are preferably formed at a free end of respective sleeves 28, 29 each of which is appropriately shaped to constitute a respective connector of the heat exchange cell 10 with the hydraulic components of a heating apparatus or system—not shown—in which the cell 10 is installed.

Preferably, the sleeves 28, 29 extend from the peripheral wall 11c of the containment casing 11 and preferably formed as a single piece with the half shell 11b (the lower one in the exemplifying horizontal mounting configuration of the cell 10) of the casing 11.

In this preferred embodiment, the inlet openings 13c and outlet openings 13d of the first heat transfer fluid of the heat exchanger 13 are housed in the sleeves 28, 29 as illustrated in FIG. 3.

The sleeves 28, 29 are therefore preferably configured so as to house the inlet openings 13c and outlet openings 13d of the heat exchanger 13 so as to allow, as described above, respectively the inlet and outlet of the first heat transfer fluid (water to be heated) to/from the heat exchanger 13.

In the operating configuration of the heat exchange cell 10, the openings 12b, 12c of the sleeves 28, 29 extending from the containment casing 11 are placed respectively to the rear and to the front with respect to each other, with respect to the axial extension of the cell 10 along the longitudinal axis A-A of the helix of the heat exchanger 13, and are facing downwards, in the event of horizontal mounting of the cell 10, so as to facilitate the connection with external components (not shown) of the heating apparatus or system in which the cell 10 is installed.

Figure 2A:
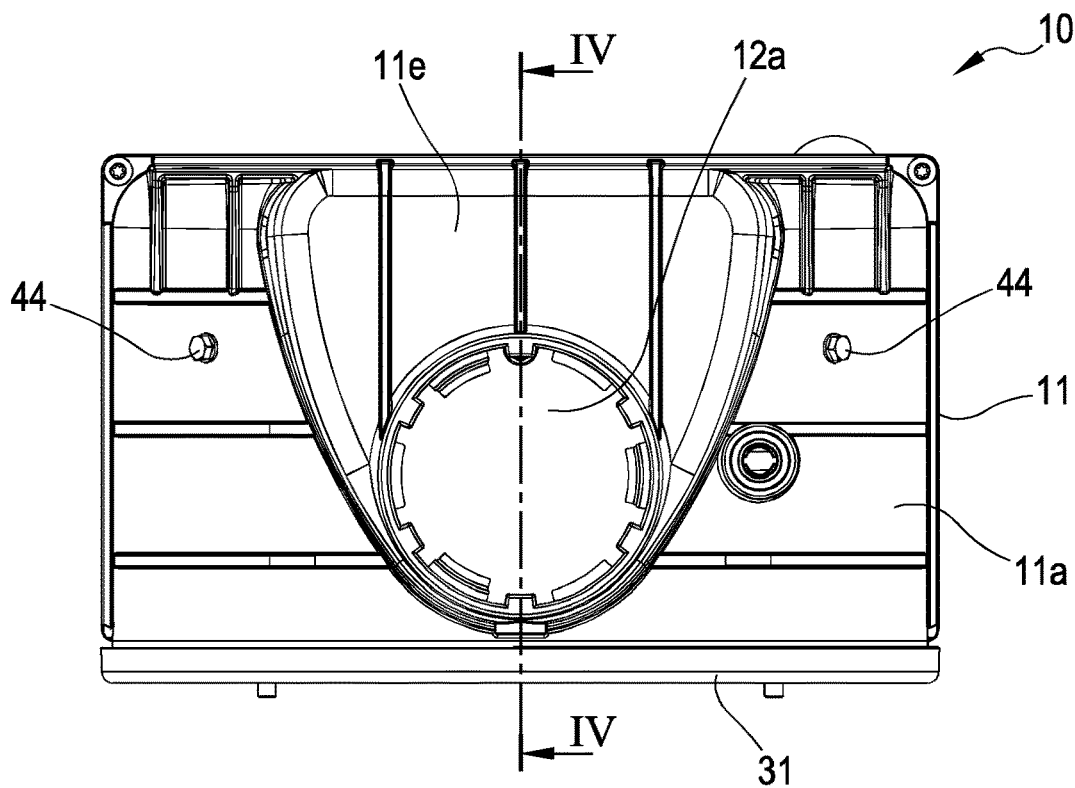
Figure 2B:
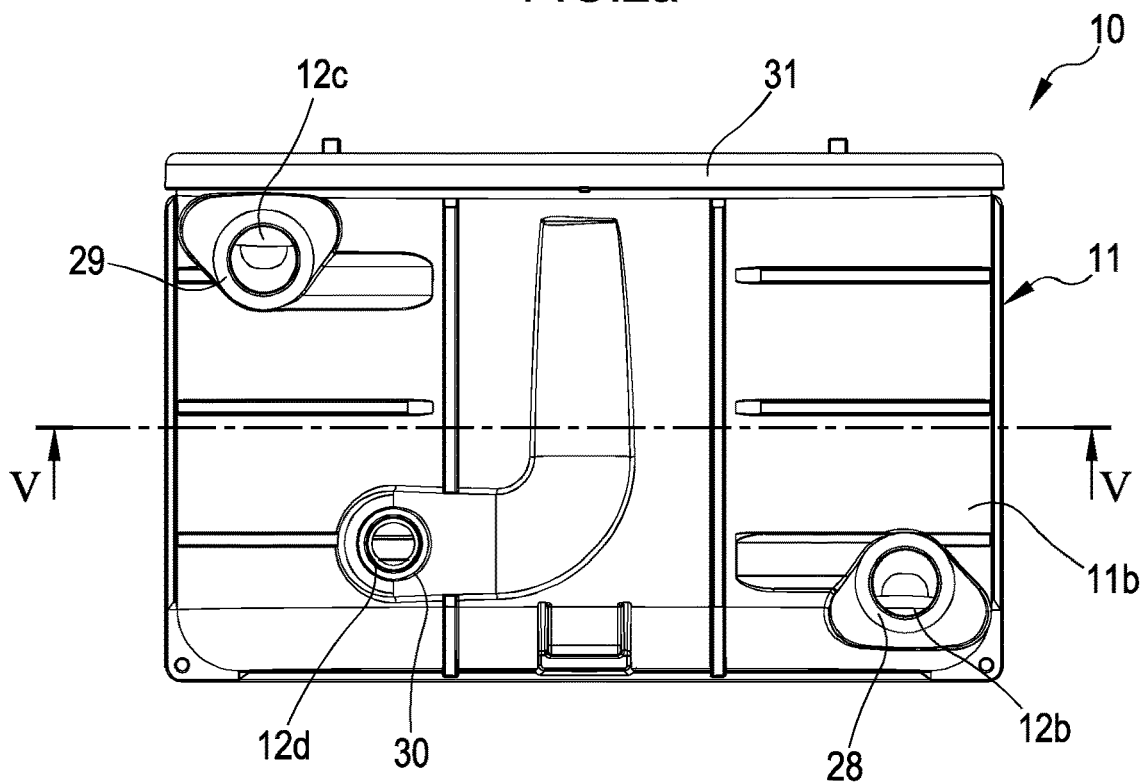
Figure 5:
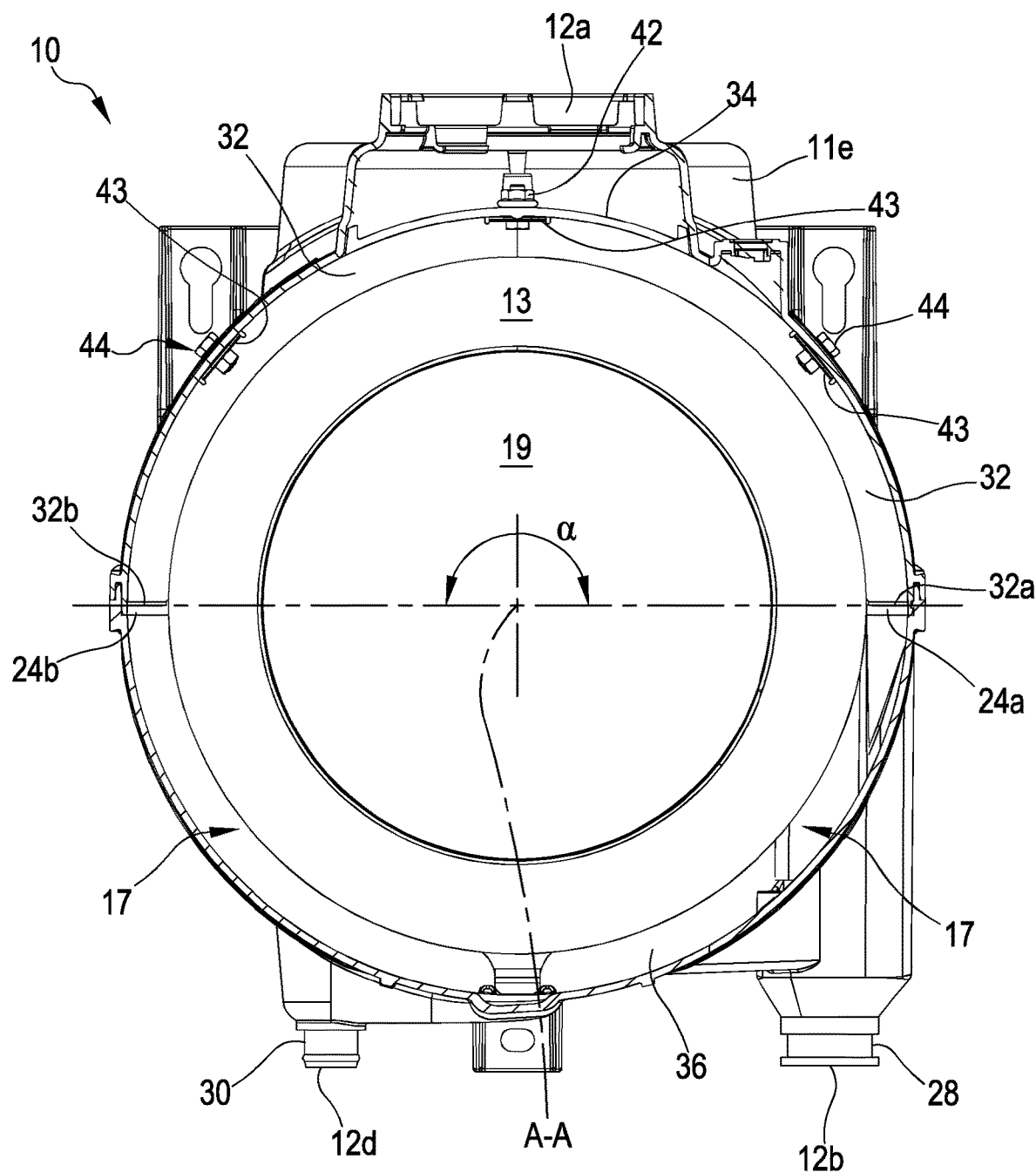

In the preferred embodiment illustrated of the heat exchange cell 10 and as such cell is of the condensation type, the containment casing 11 is further preferably provided with a fourth opening 12d formed at a free end of a respective sleeve 30 extending from the peripheral wall 11c of the containment casing 11 and preferably formed as a single piece with the half shell 11b (the lower one in the exemplifying horizontal mounting configuration of the cell 10) of the casing 11 (see FIGS. 2b and 5).

The opening 12d is configured for the discharge of the condensate generated during the heat exchange process between the two heat transfer fluids and that is collected in the lower part of the containment casing 11.

The heat exchange cell 10 according to the present invention comprises a first heat exchange chamber 22 defined in the containment casing 11 and in which a first heat exchange portion of the heat exchanger 13 is housed.

The first heat exchange chamber 22 comprises in turn a first collection chamber 15 of the second heat transfer fluid externally defined with respect to the heat exchanger 13 between a radially outer wall 13a of the first heat exchange portion of the heat exchanger 13 and the peripheral side wall 11c of the containment casing 11.

The heat exchange cell 10 according to the present invention further comprises a second heat exchange chamber 26 defined in the containment casing 11 and in which a second heat exchange portion of the heat exchanger 13 is housed.

The second heat exchange chamber 26 comprises a second collection chamber 16 of the second heat transfer fluid externally defined with respect to the heat exchanger 13 between the radially outer wall 13a of the second heat exchange portion of the heat exchanger 13 and the peripheral side wall 11c of the containment casing 11.

In this case, and as the heat exchanger 13 is formed by the helically-shaped tubular duct, the outer wall 13a of its two heat exchange portions is discontinuous, i.e. axially interrupted by the interstices 13b defined between successive coils of the exchanger, and is formed by the radially outer face of the coils of the tubular duct itself.

In the preferred embodiment illustrated, the heat exchange cell 10 further comprises an annular element 36 positioned at the rear wall 11d of the casing 11 and that cooperates in abutment with the heat exchanger 13 so as to guarantee both an effective gas seal and the correct positioning of the heat exchanger 13 inside the casing 11.

In a preferred embodiment, the annular element 36 is extending as a single piece from the rear wall 11d of the casing 11.

Preferably, the annular element 36 extends at least in part in a spiral with substantially the same winding pitch as the coils of the heat exchanger so as to guarantee an effective abutment for the heat exchanger 13.

The first and the second heat exchange chambers 22, 26 are separated inside the heat exchanger 13 by a first separating element 14 comprising a substantially plate-shaped body, which will be described in more detail below.

In the preferred embodiment illustrated, the first separating element 14 comprises an annular crown 14b interposed between the coils of the first heat exchange portion and the coils of the second heat exchange portion of the heat exchanger 13.

Preferably, the annular crown 14b of the first separating element 14 is formed as a single piece with the body of such element.

Preferably, the annular crown 14b of the first separating element 14 is made of a material, preferably metal, with high heat conductivity, such as aluminium or steel.

Preferably, the body of the first separating element 14 centrally defines a seat 14a in which an element 19 made of heat insulating material is housed, so that it faces towards the combustion chamber 21 (feeding zone of the second heat transfer fluid in the cell 10).

Preferably, the heat-insulating element 19 is substantially disc-shaped.

Preferably, the annular crown 14b of the first separating element 14 extends at least partially in a spiral substantially with the same winding pitch as the coils of the heat exchanger 13.

Preferably, the annular crown 14b of the first separating element 14 has a substantially equal thickness to the thickness of the interstice 13b defined between the flat surfaces of two successive coils of the heat exchanger 13.

In a preferred embodiment, the first separating element 14 can comprise a plurality of heat exchange protrusions 23, e.g. substantially pin shaped, extending from a rear face thereof facing towards the rear wall 11d of the casing 11.

These possible heat exchange protrusions 23 are shown in broken lines in FIG. 4.

In this way, it is advantageously possible to increase the exchange surface area of the first separating element 14, therefore increasing the amount of heat exchange between the second heat transfer fluid and the heat exchange portion of the first separating element 14 inside the second heat exchange chamber 26.

The heat exchange cell 10 further comprises a fluid outlet passage 35 from the second collection chamber 16 of the second heat transfer fluid peripherally defined in the peripheral side wall 11c of the containment casing 11 near the rear wall 11d of the casing 11.

More particularly, the fluid outlet passage 35 is preferably peripherally defined between an axial end 11g of the peripheral side wall 11c and the rear wall 11d of the containment casing 11.

In the preferred embodiment illustrated and as will appear more clearly below, the peripheral side wall 11c is formed in part by the half-shell 11a and in part by a plate-shaped element 34 housed in a concealed way in the thickness of the peripheral side wall 11c.

In this preferred embodiment, therefore, the axial end 11g of the peripheral side wall 11c of the containment casing 11 is defined at the rear axial end of the plate-shaped element 34.

In the preferred embodiment illustrated and as can be seen in FIG. 4, the plate shaped element 34 is fixed to the cap 11e through the use of a pin 40 extending from said cap in a corresponding housing seat defined in a projection 41 fixed to, and preferably formed as a single piece with, the plate shaped element 34.

The first and the second heat exchange chamber 22, 26 are further separated outside the heat exchanger 13 by a second separating element 32 extending radially between the radially outer wall 13a of the heat exchanger 13 and the peripheral side wall 11c of the containment casing 11.

Preferably, the second separating element 32 is substantially shaped like a sector of a circular crown.

Preferably, the second separating element 32 is made of a material, preferably metal, with high heat conductivity, such as steel or aluminium.

The second separating element 32 is extending circumferentially about the heat exchanger 13 for a portion having a predefined angular extension at the fluid outlet passage 35 from the second heat exchange chamber 26 so as to prevent the direct passage of most of the second heat transfer fluid towards the passage 35 and define a fluid passage 17 between the first 15 and the second 16 collection chamber of the second heat transfer fluid in a distal zone with respect to such passage 35.

In the horizontal mounting configuration of the cell 10, the fluid passage 17 between the first 15 and the second 16 collection chamber of the second heat transfer fluid is defined in the lower zone of the cell 10.

Preferably, the second separating element 32 is extending circumferentially about the heat exchanger 13 substantially astride of a longitudinal centerline plane of the fluid outlet passage 35 from the second heat exchange chamber 26.

In the preferred embodiment illustrated and for purely exemplifying and non-limiting purposes, the second separating element 32 has a circumferential extension about the heat exchanger 13 defined by an angle, whose vertex is positioned on the longitudinal axis A-A of the heat exchanger 13, equal to about 180°.

Such circumferential extension is shown in FIG. 5 by the angle α which is the angle in fact defined between two half-planes that join the longitudinal axis A-A of the heat exchanger 13 (and of the cell 10) and opposing ends 32a, 32b of the second separating element 32.

Preferably, the second separating element 32 extends between the peripheral side wall 11c of the casing 11 and the heat exchanger 13 at the first separating element 14, more preferably at the annular crown 14b of the first separating element 14.

In the preferred embodiment illustrated, the second separating element 32 is formed as a single piece with the annular crown 14b of the first separating element interposed between the coils of the first heat exchange portion and the coils of the second heat exchange portion of the heat exchanger 13 and extends radially from such annular crown 14b.

In a preferred embodiment and as described above, the second separating element 32 is configured to close at least 90%, more preferably at least 92%, even more preferably at least 95% of the cross-sectional area of the first collection chamber 15 of the second heat transfer fluid defined in a radially outer position to the heat exchanger 13 in the first heat exchange chamber 22.

In a particularly preferred embodiment and as illustrated in the figures, the second separating element 32 is configured to substantially completely close, apart from the inevitable leakages due to the processing tolerances of the various components of the cell 10, the cross section of the first collection chamber 15 of the second heat transfer fluid.

Preferably, the second separating element 32 is configured so as to substantially abut against the peripheral side wall 11c of the containment casing 11, even more preferably with a substantial fluid seal, notwithstanding the inevitable leakages due to the processing tolerances of the containment casing 11, of the second separating element 32 and of the first separating element 14.

The second separating element 32 is therefore configured to prevent a direct passage of the second heat transfer fluid from the first collection chamber 15 towards the fluid outlet passage 35 from the second heat exchange chamber 26 and to conveniently direct such heat transfer fluid towards the passage 17 of fluid between the first 15 and the second 16 collection chamber of the second heat transfer fluid defined in the zone of the cell 10 distal from the fluid outlet passage 35 from the second heat exchange chamber 26 (in the preferred example illustrated in the lower zone of the cell 10).

As described above, the Applicant has experimentally found that by appropriately adjusting the circumferential extension of the second separating element 32 it is possible to achieve the advantageous technical effect of optimizing the fluid dynamics of the second heat transfer fluid—which substantially radially or axially-radially crosses towards the outside of the heat exchanger 13 in the first heat exchange chamber 22—substantially along the whole axial extension of the first heat exchange portion of the heat exchanger 13 and substantially along the whole circumferential extension of this first portion.

In this way, it is advantageously possible to significantly reduce preferential fluid paths, by improving the distribution of the flow of the second heat transfer fluid in crossing the coils of the heat exchanger 13 positioned upstream of the second separating element 32.

In particular, the Applicant has found that the flow rate of the second heat transfer fluid that radially or axially-radially crosses the first heat exchange portion of the heat exchanger 13 passing into the interstice 13b defined between coil and coil can be made substantially constant along the axial section of such first heat exchange portion of the heat exchanger 13 positioned in the first heat exchange chamber 22.

The Applicant also considers that such flow rate is made substantially constant also along the circumferential extension of the first heat exchange portion of the heat exchanger 13 so that the second heat transfer fluid transits uniformly in the first annular collection chamber 15 along the circumferential extension of such first heat exchange portion, significantly reducing the presence of dead zones not travelled by the fluid in the first collection chamber 15 of the second heat transfer fluid.

The Applicant has also experimentally found that by appropriately defining the circumferential extension of the second separating element 32 it is also possible to optimize the fluid dynamics of the second heat transfer fluid by flowing through the first collection chamber 15 in the first heat exchange chamber 22 of the cell 10 defined upstream of the second separating element 32 and by flowing through the passage 17 towards the second collection chamber 16 defined in the second heat exchange chamber 26.

In the preferred embodiment illustrated in the figures, the cross-sectional area of fluid flow 17 defined between the first 15 and the second 16 collection chamber of the second heat transfer fluid by the second separating element 32 is in particular uniformly distributed along the peripheral side wall 11c of the containment casing 11 (see FIG. 5).

Preferably, the second separating element 32 is removably fixed to the plate-shaped element 34 that forms part of the peripheral side wall 11c of the casing 11 through means that are conventional per se, such as a bolt 42 that connects a fin 43 extending axially from the second separating element 32 to the plate-shaped element 34.

Preferably, the second collection chamber 16 of the second heat transfer fluid is in fluid connection with a third collection chamber 18 of the second heat transfer fluid defined downstream of the fluid outlet passage 35.

More particularly, the third collection chamber 18 is in fluid connection with the fluid outlet passage 35 from the second collection chamber 16 and with the outlet opening 12a of the second heat transfer fluid of the cell 10, defined downstream of the third collection chamber 18, as shown in FIG. 4.

The third collection chamber 18 of the second heat transfer fluid is defined in the cap 11e, which extends from the peripheral side wall 11c of the casing radially towards the outside of the casing 11, and in which the outlet opening 12a is realized.

In this preferred embodiment of the cell 10, therefore, the cap 11e is positioned downstream of the fluid outlet passage 35 from the second collection chamber 16 and from the second heat exchange chamber 26.

Figure 6:
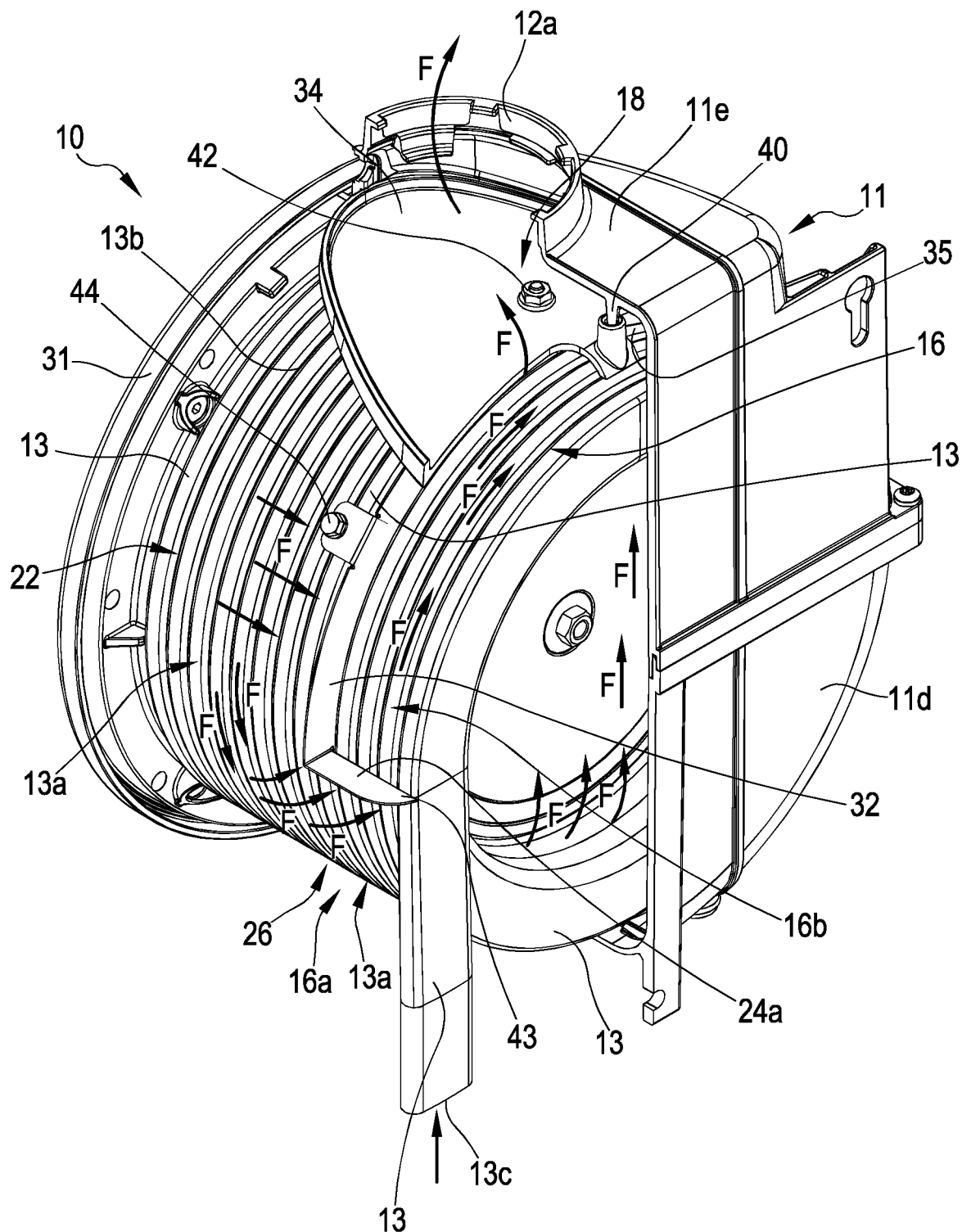

More details on the configuration of the heat exchange cell 10 of this preferred embodiment and, in particular, of the peripheral side wall 11c, of the first separating element 14, of the second and third collection chambers 16, 18 and of the fluid outlet passage 35 can be found in FIGS. 3, 4 and 6.

In the preferred embodiment illustrated in the figures, the cap 11e is realized at an inner opening formed in the thickness of the peripheral side wall 11c of the casing 11 and intended to house with a shape coupling the plate-shaped element 34.

In such preferred embodiment, the cap 11e is realized in axis with the centerline plane of the heat exchange cell 10 and, as described above, is preferably formed as a single piece with the peripheral side wall 11c of the casing 11.

In an alternative preferred embodiment, not illustrated, the cap 11e can comprise an independent element, anchored to the peripheral side wall 11c of the casing 11 through appropriate fixing means.

According to the invention, the heat exchange cell 10 further comprises a pair of axial separator baffles 24a, 24b extending axially between the second separating element 32 and the rear wall 11d of the containment casing 11.

The axial separator baffles 24a, 24b are in particular configured to separate a first portion 16a of the second collection chamber 16 of the second heat transfer fluid defined upstream of the axial separator baffles 24a, 24b of a second portion 16b of the second collection chamber 16 of the second heat transfer fluid defined downstream of the partition walls 24a, 24b.

In the preferred embodiment illustrated, the axial separator baffles 24a, 24b are radially extending between the radially outer wall 13a of the second heat exchange portion of the heat exchanger 13 and the peripheral side wall 11c of the casing 11 of the cell 10.

In this way, it is advantageously possible to achieve in a structurally simple way the desired configuration of the partition walls 24a, 24b adapted to suitably subdivide the second heat exchange chamber 26 and to separate from each other the first and the second portion of the second collection chamber 16 of the second heat transfer fluid defined respectively upstream and downstream of the axial separator baffles 24a, 24b.

In the preferred embodiment illustrated, the axial separator baffles 24a, 24b are formed as a single piece with the second separating element 32.

In this preferred embodiment and as can be appreciated from FIG. 3, therefore, the first separating element 14, the second separating element 32 and the axial separator baffles 24a, 24b are formed as a single piece with each other so as to advantageously reduce the number of elements that compose the heat exchange cell 10.

Specifically, the axial separator baffles 24a, 24b extend as a single piece from the opposing ends 32a, 32b of the second separating element 32 (see FIGS. 5 and 6).

In this case, it is advantageously possible to achieve structural continuity between the second separating element 32 and the axial separator baffles 24a, 24b so as to prevent possible leakages at the interface between them along a circumferential direction in a radially outer position to the second heat exchange portion of the heat exchanger 13.

Preferably, the second separating element 32 and the axial separator baffles 24a, 24b are made of a metal that is a good heat conductor, preferably steel or aluminium.

Preferably, the second separating element 32 and the axial separator baffles 24a, 24b are made of sheet metal, e.g. steel, relatively thin, e.g. having a thickness substantially equal to the thickness of the interstice 13b defined between the flat surfaces of two successive coils of the heat exchanger 13.

In a completely exemplifying way, the second separating element 32 and the axial separator baffles 24a, 24b may have a thickness preferably comprised between about 0.6 and about 1.0 mm.

In the preferred embodiment illustrated, and as the second separating element 32 and the axial separator baffles 24a, 24b are made of relatively thin sheet metal, it is possible to envisage, in a completely exemplifying and non-limiting way, the removable fixing to the side wall 11c of the casing 11, realized in a way that is known per se, e.g. through one or more bolts, all indicated with reference number 44.

Preferably, the second separating element 32 is provided for this purpose with one or more further fins 43 extending axially from the second separating element 32 for fixing to the side wall 11c of the casing 11 (see FIGS. 3, 5 and 6).

In the preferred embodiment illustrated, the axial separator baffles 24a, 24b are also symmetrically positioned with respect to a centerline plane of the second separating element 32.

In this way, it is advantageously possible to have a balanced and symmetrical distribution of the flow of the second heat transfer fluid in passing through the first portion 16a of the second collection chamber 16 of the second heat transfer fluid and in the subsequent passing through of the coils of the heat exchanger 13 positioned immediately downstream of such first portion 16a.

In a preferred embodiment and as described above, the axial separator baffles 24a, 24b are configured to close at least 90%, more preferably at least 92%, even more preferably at least 95% of the cross section of the second collection chamber 16 of the second heat transfer fluid defined in a radially outer position to the heat exchanger 13 in the second heat exchange chamber 26.

In a particularly preferred embodiment and as illustrated in the figures, the axial separator baffles 24a, 24b are configured to substantially completely close, apart from the inevitable leakages due to the processing tolerances of the various components of the cell 10, the cross section of the second collection chamber 16 of the second heat transfer fluid.

In the preferred embodiment illustrated, therefore, the axial separator baffles 24a, 24b are axially extending between the second separating element 32 and the rear wall 11d of the containment casing 11 of the cell 10 substantially along the entire axial extension of the second collection chamber 16 of the second heat transfer fluid defined in the second heat exchange chamber 26.

More preferably, the axial separator baffles 24a, 24b extend in the second collection chamber 16 of the second heat transfer fluid so as to substantially abut against the rear wall 11d of the containment casing 11 of the cell 10.

In this way and as disclosed above, it is advantageously possible to substantially limit and, more preferably, substantially prevent (still notwithstanding the inevitable leakages due to processing tolerances), the fluid communication between the first portion 16a and the second portion 16b of the second collection chamber 16 of the second heat transfer fluid defined respectively upstream and downstream of the axial separator baffles 24a, 24b.

In this way, it is advantageously possible to appropriately close the second portion 16b of the second collection chamber 16 of the second heat transfer fluid defined externally to the second heat exchange portion of the heat exchanger 13 downstream of the axial separator baffles 24a, 24b.

In this way, it is also advantageously possible to substantially divert the whole flow of second heat transfer fluid towards the coils of the heat exchanger 13 positioned in the first portion of the second heat exchange chamber 26 defined upstream of the axial separator baffles 24a, 24b.

In this way, the cell 10 achieves an advantageous increase in the amount of the heat exchange between the second heat transfer fluid and:
  i) the coils of the heat exchanger 13 positioned in the first portion of the second heat exchange chamber 26 defined upstream of the axial separator baffles 24a, 24b,
  ii) the first separating element 14 (or better the rear face thereof) positioned inside the heat exchanger 13 in the second heat exchange chamber 26, and
  iii) the coils of the heat exchanger 13 positioned in the second portion of the second heat exchange chamber 26 defined downstream of the axial separator baffles 24a, 24b.

All this happens with an increase in seasonal space heating energy efficiency is of the cell, in particular the efficiency in active mode ηson and the quantity of latent condensation heat of the combustion gases recovered in the second heat exchange chamber 26.

In the preferred embodiment illustrated, the second portion 16b of the second collection chamber 16 of the second heat transfer fluid defined downstream of the axial separator baffles 24a; 24b is circumferentially extending about the heat exchanger 13 for a portion having an angular extension equal to the circumferential extension of the second separating element 32.

Advantageously, this preferred characteristic is conveniently achieved thanks to the fact that the axial separator baffles 24a, 24b extend axially from the opposing ends 32a, 32b of the second separating element 32.

In the preferred embodiment illustrated and thanks to the configuration of the second separating element 32 and of the axial separator baffles 24a, 24b, cooperating with each other in subdividing, preferably in a substantially gas-tight manner (save for, as mentioned, the inevitable leakages due to processing tolerances), the second heat exchange chamber 26 of the cell 10, it is therefore advantageously possible to vary (and determine during the manufacturing of the heat exchange cell) the circumferential extension of the first and of the second portion 16a, 16b of the second collection chamber 16 of the second heat transfer fluid as a function of the fluid dynamic characteristics and the heat exchange characteristics that are to be obtained in the second heat exchange chamber 26 of the cell 10.

Thus, for example, it is possible to vary the circumferential extension of the first and of the second portion 16a, 16b of the second collection chamber 16 of the second heat transfer fluid by varying the circumferential extension of the second separating element 32 and positioning the axial separator baffles 24a, 24b appropriately along the circumferential extension of the second separating element 32.

A preferred embodiment of a heat exchange method according to the invention that can be actuated with the cell 10 previously described will now be described, with particular reference to FIGS. 1-6.

In an initial step of the method, the second heat transfer fluid is fed in the feeding zone 21, e.g. through the generation of combustion gases by the burner 20 positioned in such area (combustion chamber 21).

In a subsequent step, the method comprises the step of carrying out in the first heat exchange chamber 22 a first heat exchange between the second heat transfer fluid (combustion gas) and the first heat transfer fluid (heating water) flowing in the first heat exchange portion of the heat exchanger 13 by flowing through the coils of the heat exchanger 13 positioned in the first heat exchange chamber 22.

In this step, the second heat exchange fluid (combustion gas) crosses the coils of the heat exchanger 13 along a substantially radial direction (or axial-radial in the case of coils inclined with respect to the longitudinal axis A-A of the heat exchanger 13) passing through the interstices 13b formed between two successive coils of the heat exchanger 13.

During such passage, there is an exchange of heat between the second heat transfer fluid and the first heat transfer fluid circulating in the first heat exchange portion of the heat exchanger 13 preferably in counter current with respect to the flow direction of the combustion gases.

For better understanding of the method according to the invention, the flow of the second heat transfer fluid (combustion gas) inside the cell 10 is shown in the figures by the arrows F.

In a subsequent step, the method comprises collecting the second heat transfer fluid (combustion gas) in the first collection chamber 15 defined in the first heat exchange chamber 22 of the cell 10 externally to the heat exchanger 13.

In a subsequent step, the method comprises sending the second heat transfer fluid collected in the first collection chamber 15 into the second heat collection chamber 16 defined in the second heat exchange chamber 26 of the cell 10, substantially parallel to the peripheral side wall 11c of the casing 11 and in proximity thereto.

According to the method that can be actuated through the preferred embodiment of the cell 10 illustrated in the figures, this step of sending the combustion gases (second heat transfer fluid) is actuated through the passage 17 formed inside the casing 11 of the cell 10 by the second separating partition wall 32 between the first collection chamber 15 of the second heat transfer fluid and the first portion 16a of the second collection chamber 16 of the second heat transfer fluid.

As described above, such first portion 16a of the second collection chamber 16 is defined externally to the heat exchanger 13 in a corresponding first portion of the second heat exchange chamber 26 upstream of the axial separator baffles 24a, 24b.

In a subsequent step, the method according to the invention comprises carrying out in the second heat exchange chamber 26 a second heat exchange between the second heat transfer fluid and the first heat transfer fluid flowing in the second heat exchange portion of the heat exchanger 13 by passing through the coils of the heat exchanger 13 positioned in the first portion of the second heat exchange chamber 26.

Advantageously, this second heat exchange takes place between the substantial totality of the flow of the second heat transfer fluid that is directed towards the coils of the heat exchanger 13 positioned in the first portion of the second heat exchange chamber 26 by the second separating element 32 and by the axial separator baffles 24a, 24b.

In a subsequent step, the method according to the invention comprises carrying out in the second heat exchange chamber 26 a third heat exchange between the second heat transfer fluid and the first separating element 14 by passing through in a substantially transversal direction of the zone of the second heat exchange chamber 26 defined inside the heat exchanger 13.

Advantageously, this third heat exchange allows the heat to be effectively removed from the first separating element 14 transferring it to the second heat transfer fluid previously cooled while crossing the coils of the heat exchanger 13 positioned in the first portion of the second heat exchange chamber 26.

In a subsequent step, the method according to the invention comprises carrying out in the second heat exchange chamber 26 a fourth heat exchange between the second heat transfer fluid and the first heat transfer fluid flowing in the second heat exchange portion of the heat exchanger 13 by flowing through the coils of the heat exchanger 13 positioned in the second portion of the second heat exchange chamber 26 defined downstream of the axial separator baffles 24a, 24b.

Advantageously, this fourth heat exchange allows losses to be substantially reduced towards the chimney of the residual heat possessed by the second heat transfer fluid that has passed through in a substantially transversal direction the zone of the second heat exchange chamber 26 defined inside the heat exchanger 13.

Indeed, this residual heat is substantially completely yielded to the first heat transfer fluid flowing in the second heat exchange portion of the heat exchanger 13 positioned downstream of the axial separator baffles 24a, 24b.

As described above, the Applicant has experimentally found a significant increase in the performance of the heat exchange cell 10 in the recovery of latent condensation heat of the combustion gases.

In particular and as described above, the Applicant has experimentally found, in the aforementioned prolonged working tests in relation to 10 years of operation, that the recovery of the latent condensation heat of the combustion gases in the second heat exchange chamber 26 reaches a level such as to obtain a flow of condensate able to perform an effective "washing" action on the coils of the heat exchanger 13 located in the lower part of the second heat exchange chamber 26, i.e. the one particularly subject to possible incrustation accumulation.

At the end of the performed experimental tests, indeed, the Applicant was able to verify that the surface of the coils of the heat exchanger 13 located in the second heat exchange chamber 26 were totally free from incrustations or deposits of unburned particles.

In a subsequent step, the method according to the invention comprises discharging the second heat transfer fluid from the second heat exchange chamber 26 along a direction substantially perpendicular to the longitudinal axis A-A of the heat exchange cell 10 through the fluid outlet passage 35 from the second heat exchange chamber 26.

Advantageously, the cell 10 and the heat exchange method that can be actuated through such cell allow an increase—thanks to the formation of a uniform flow directed transversally in the second heat exchange chamber 26—of the heat exchange efficiency of the cell and in particular—when desired—an increase in the condensation effect thanks to improved heat exchange between the second heat transfer fluid and all the elements of the cell 10 present in the second heat exchange chamber 26 and in a heat exchange relation with such fluid (coils of the second heat exchange portion of the heat exchanger 13 and rear wall of the first separating element 14).

As described above, the Applicant has experimentally found, in the aforementioned prolonged working tests, that the configuration of the second heat exchange chamber 26 of the cell 10 according to the invention also allows, very advantageously, its performance characteristics to be kept substantially unaltered over time.

Indeed, the configuration of the second heat exchange chamber 26 of the heat exchange cell 10 according to the invention allows compensation during the operation of the cell 10 for a progressive reduction in heat exchanged in the first heat exchange chamber 22 with a corresponding progressive increase in heat exchanged in the second heat exchange chamber 26 of the cell 10.

This is thanks to the fact that, as described above, the second heat transfer fluid is forced to cross in series and along a substantially transversal direction the coils of the second heat exchange portion of the heat exchanger 13 positioned upstream of the axial separator baffles 24*a*, 24*b*, the zone of the second heat exchange chamber 26 defined inside the heat exchanger 13 and the coils of the second heat exchange portion of the heat exchanger located downstream of the axial separator baffles 24*a*, 24*b*.

In this way, the heat exchange cell 10 according to the invention is advantageously able to substantially completely recover in the second heat exchange chamber 26 any heat not exchanged in the first heat exchange chamber 22 due to a gradual deposit of incrustations on the internal part of the heat exchanger 13.

In a preferred embodiment, the method comprises adjusting the fluid dynamics of the second heat transfer fluid sent towards the second heat exchange chamber 26 by adjusting the overall cross-sectional area of fluid flow of the passage 17 formed between the radially outer wall 13*a* of the heat exchanger 13 and the peripheral side wall 11*c* of the containment casing 11 of the cell 10.

As disclosed above, this adjustment is realized by appropriately defining the circumferential extension of the second separating element 32.

In a preferred embodiment, the method comprises adjusting the amount of the second and of the fourth heat exchange, carried out between the second heat transfer fluid and the first heat transfer fluid flowing in the second heat exchange portion of the heat exchanger 13 by passing through the coils of the heat exchanger 13 positioned in the first and, respectively, in the second portion of the second heat exchange chamber 26.

This adjustment step is preferably advantageously obtained by adjusting the circumferential position of said axial separator baffles 24*a*; 24*b* along the radially outer wall 13*a* of the heat exchanger 13.

In a preferred embodiment, the method comprises increasing the amount of the second heat exchange carried out in the second zone of the second heat exchange chamber 26 through the heat exchange protrusions 23 described above.

The Applicant has experimentally found that thanks to the advantageous characteristics of the cell 10 and of the method described above, the amount of heat exchange that takes place in the second heat exchange chamber 26 of the cell 10 can be optimized so as to increase the seasonal space heating energy efficiency is of the cell 10, and in particular the efficiency in active mode $\eta_{son}$, having a much larger preponderant impact on the determination of the seasonal energy efficiency is of the cell, with respect to cell configurations of the prior art.

The invention claimed is:

1. A heat exchange cell comprising:
   a containment casing comprising a rear wall and a peripheral side wall,
   a helically-shaped heat exchanger comprising a tubular duct for the flow of a first heat transfer fluid, the tubular duct being coiled about a longitudinal axis of a helix including a plurality of coils; said heat exchanger being mounted in said containment casing;
   a feeding zone of a second heat transfer fluid, intended for a heat exchange with said first heat transfer fluid, the feeding zone being defined in the casing coaxially and internally with respect to said heat exchanger;
   a first heat exchange chamber, defined in said containment casing and in which a first heat exchange portion of the heat exchanger is housed, said first heat exchange chamber comprising a first collection chamber of the second heat transfer fluid externally defined with respect to the heat exchanger between a radially outer wall of the first heat exchange portion of the heat exchanger and the peripheral side wall of the containment casing;
   a second heat exchange chamber, defined in said containment casing and in which a second heat exchange portion of the heat exchanger is housed, said second heat exchange chamber comprising a second collection chamber of the second heat transfer fluid externally defined with respect to the heat exchanger between a radially outer wall of the second heat exchange portion of the heat exchanger and the peripheral side wall of the containment casing;
   a fluid outlet passage from the second heat exchange chamber peripherally defined between an axial end of the peripheral side wall of the containment casing and the rear wall of said casing;
   wherein said first and second heat exchange chamber are separated inside the heat exchanger by a first partition comprising a plate-shaped body;
   wherein said first and second heat exchange chambers are further separated outside the heat exchanger by a second partition, radially extending between a radially outer wall of the heat exchanger and the peripheral side wall of the containment casing, said second partition being circumferentially extended about the heat exchanger at least at said fluid outlet passage from the second heat exchange chamber and at said first partition so as to define at least one fluid passage between the first and the second collection chambers of the second heat transfer fluid;
   and wherein the heat exchange cell further comprises a pair of axial separator baffles, axially extending from said second partition up to the rear wall of the containment casing and extending between said radially outer wall of the second heat exchange portion of the heat exchanger and the peripheral side wall of the containment casing, the axial separator baffles being configured to separate a first portion of the second collection chamber of the second heat transfer fluid defined upstream of said axial separator baffles from a second portion of the second collection chamber of the second heat transfer fluid defined downstream of said baffles.

2. The heat exchange cell according to claim 1, wherein said second partition is configured to close at least 90% of a cross-sectional area of the first collection chamber of the second heat transfer fluid defined at a radially outer position with respect to the heat exchanger in the first heat exchange chamber.

3. The heat exchange cell according to claim 1, wherein said second partition has a circumferential extension about the heat exchanger defined by an angle of 25° to 200°.

4. The heat exchange cell according to claim 1, wherein said second partition is configured to allow a peripheral flow of the second heat transfer fluid inside the containment casing towards the second heat exchange chamber along a direction parallel to the peripheral side wall of the casing and adjacent thereto.

5. The heat exchange cell according to claim 1, wherein said second partition is circumferentially extending astride of a longitudinal centerline plane of the fluid outlet passage from the second heat exchange chamber.

6. The heat exchange cell according to claim 1, wherein the first partition comprises an annular crown at least partially interposed between the coils of the tubular duct of the first heat exchange portion of the heat exchanger and the coils of the tubular duct of the second heat exchange portion of the heat exchanger.

7. The heat exchange cell according to claim 6, wherein said second partition radially extends from said annular crown or from the peripheral side wall of the casing.

8. The heat exchange cell according to claim 1, wherein said axial separator baffles are radially extending from said radially outer wall of the second heat exchange portion of the heat exchanger to the peripheral side wall of the casing.

9. The heat exchange cell according to claim 1, wherein said axial separator baffles are fixed to, or integrally formed with, said second partition.

10. The heat exchange cell according to claim 1, wherein said axial separator baffles radially extend from the peripheral side wall of the casing.

11. The heat exchange cell according to claim 1, wherein said axial separator baffles are configured to close at least 90% of a cross-sectional area of the second collection chamber of the second heat transfer fluid externally defined with respect to the heat exchanger in the second heat exchange chamber.

12. The heat exchange cell according to claim 11, wherein said axial separator baffles are axially extending from said second partition up to the rear wall of the containment casing along the entire axial development of the second collection chamber of the second heat transfer fluid defined in the second heat exchange chamber.

13. The heat exchange cell according to claim 1, wherein the second portion of the second collection chamber of the second heat transfer fluid defined downstream of said axial separator baffles is circumferentially extending about the heat exchanger for a portion having an angular extension equal to or less than the circumferential extension of said second partition.

14. The heat exchange cell according to claim 1, wherein said axial separator baffles are axially extending from opposite end edges of said second partition.

15. The heat exchange cell according to claim 1, wherein said axial separator baffles are symmetrically positioned with respect to a centre line plane of said second partition.

16. A heat exchange method between a first heat transfer fluid and a second heat transfer fluid in a heat exchange cell, said heat exchange cell comprising:
    a containment casing comprising a rear wall and a peripheral side wall,
    a helically-shaped heat exchanger comprising a tubular duct for the flow of a first heat transfer fluid, the tubular duct being coiled about a longitudinal axis of the helix according to a plurality of coils, said heat exchanger being mounted in said containment casing;
    a feeding zone of a second heat transfer fluid, intended for the heat exchange with said first heat transfer fluid, defined in the casing coaxially and internally with respect to said heat exchanger;
    a first heat exchange chamber, defined in said containment casing and in which a first heat exchange portion of the heat exchanger is housed, said first heat exchange chamber comprising a first collection chamber of the second heat transfer fluid externally defined with respect to the heat exchanger between a radially outer wall of the first heat exchange portion of the heat exchanger and the peripheral side wall of the containment casing;
    a second heat exchange chamber, defined in said containment casing and in which a second heat exchange portion of the heat exchanger is housed, said second heat exchange chamber comprising a second collection chamber of the second heat transfer fluid externally defined with respect to the heat exchanger between a radially outer wall of the second heat exchange portion of the heat exchanger and the peripheral side wall of the containment casing;
    a fluid outlet passage from the second heat exchange chamber defined in the peripheral side wall of the containment casing near the rear wall of said casing;
    wherein said first and second heat exchange chamber are separated inside the heat exchanger by a first partition comprising a plate-shaped body;
    wherein said first and second heat exchange chambers are separated outside the heat exchanger by a second partition, radially extending between the radially outer wall of the heat exchanger and the peripheral side wall of the containment casing, said second partition being circumferentially extending about the heat exchanger at least at said fluid outlet passage from the second heat exchange chamber and at said first partition so as to define a fluid passage between the first and the second collection chambers of the second heat transfer fluid;
wherein the method comprises the steps of:
    feeding the second heat transfer fluid in said feeding zone;
    carrying out in the first heat exchange chamber a first heat exchange between the second heat transfer fluid and the first heat transfer fluid flowing in the first heat exchange portion of the heat exchanger by flowing through interstices defined between the coils of the tubular duct of the heat exchanger positioned in the first heat exchange chamber;
    collecting the second heat transfer fluid in said first collection chamber of the second heat transfer fluid defined in the first heat exchange chamber outside the heat exchanger;
    sending the second heat transfer fluid from said first to said second heat exchange chamber by means of said fluid passage formed between the first collection chamber of the second heat transfer fluid and a first portion of the second collection chamber of the second heat transfer fluid, said first portion of the second collection chamber being externally defined with respect to the heat exchanger in a first portion of the second heat exchange chamber upstream of a pair of axial separator baffles axially extending from said second partition up to the rear wall of the containment casing and extending between said radially outer wall of the second heat exchange portion of the heat exchanger and the peripheral side wall of the containment casing;

carrying out in the second heat exchange chamber a second heat exchange between the second heat transfer fluid and the first heat transfer fluid flowing in the second heat exchange portion of the heat exchanger by flowing through interstices defined between the coils of the tubular duct of the heat exchanger positioned in said first portion of the second heat exchange chamber;

carrying out in the second heat exchange chamber a third heat exchange between the second heat transfer fluid and said first partition by flowing the second heat transfer fluid along a transversal direction through a zone of the second heat exchange chamber defined coaxially and internally with respect to the heat exchanger;

carrying out in the second heat exchange chamber a fourth heat exchange between the second heat transfer fluid and the first heat transfer fluid flowing in the second heat exchange portion of the heat exchanger by flowing through interstices defined between the coils of the tubular duct of the heat exchanger positioned in a second portion of the second heat exchange chamber defined downstream of said pair of axial separator baffles; and discharging the second heat transfer fluid from the second heat exchange chamber along a direction perpendicular to a longitudinal axis of the heat exchange cell through said fluid outlet passage from the second heat exchange chamber;

and wherein said first, second, third and fourth heat exchanges are carried out in series with each other.

17. The heat exchange method according to claim 16, further comprising a step of adjusting the fluid dynamics of the second heat transfer fluid sent towards the second heat exchange chamber by adjusting a circumferential extension of the second partition to adjust an overall cross-sectional area of fluid flow of said passage formed between the radially outer wall of the heat exchanger and the peripheral side wall of the containment casing.

18. The heat exchange method according to claim 16, further comprising a step of adjusting the amount of the second and fourth heat exchange, carried out between the second heat transfer fluid and the first heat transfer fluid flowing in the second heat exchange portion of the heat exchanger by flowing through the interstices defined between the coils of the tubular duct of the heat exchanger positioned in said at least one first and, respectively, in said second portion of the second heat exchange chamber, by selecting the circumferential position of said axial separator baffles along the radially outer wall of the heat exchanger.

19. A heating or air-conditioning apparatus comprising a heat exchange cell according to claim 1.

* * * * *